United States Patent
Marya

(10) Patent No.: US 12,129,740 B2
(45) Date of Patent: Oct. 29, 2024

(54) DOWNHOLE SCALE MITIGATION COMPONENT

(71) Applicant: Schlumberger Technology Corporation, Sugar Land, TX (US)

(72) Inventor: Manuel Paul Marya, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 18/249,061

(22) PCT Filed: Oct. 15, 2020

(86) PCT No.: PCT/US2020/055699
§ 371 (c)(1),
(2) Date: Apr. 14, 2023

(87) PCT Pub. No.: WO2022/081154
PCT Pub. Date: Apr. 21, 2022

(65) Prior Publication Data
US 2023/0392475 A1 Dec. 7, 2023

(51) Int. Cl.
E21B 37/06 (2006.01)
C02F 1/48 (2023.01)
E21B 43/12 (2006.01)

(52) U.S. Cl.
CPC .......... *E21B 37/06* (2013.01); *C02F 1/48* (2013.01); *E21B 43/123* (2013.01)

(58) Field of Classification Search
CPC .. E21B 37/06; E21B 37/08; C02F 1/48; C02F 1/001
See application file for complete search history.

(56) References Cited

U.S. PATENT DOCUMENTS 5,052,491 A * 10/1991 Harms ............... E21B 37/00
210/695
2011/0137589 A1* 6/2011 Leskowitz ......... G01R 33/3875
702/57

(Continued)

FOREIGN PATENT DOCUMENTS

CN 2166122 Y 5/1994
CN 203845866 U 9/2014

(Continued)

OTHER PUBLICATIONS

Kim, H.-S. et al., Figure—"The Principle of Magnetic Water Device", published in "The Effect of Magnetic Water Treatment on Milk Fat and Somatic Cell in Dairy Cow Production", downloaded on Apr. 24, 2023 from [https://www.researchgate.net/figure/The-principle-of-magnetic-water-device_fig2_315012291], 1 page.

(Continued)

Primary Examiner — Blake Michener
Assistant Examiner — Lamia Quaim
(74) Attorney, Agent, or Firm — Jeffrey D. Frantz

(57) ABSTRACT

A downhole component can include a support body that includes a surface that defines at least a portion of a fluid passage; a composite matrix for scale mitigation supported by the surface of the support body where the composite matrix includes a lattice material that defines a lattice and magnetic material disposed in interstices of the lattice; and a cover layer disposed on the composite matrix.

19 Claims, 21 Drawing Sheets

(56) References Cited

U.S. PATENT DOCUMENTS

2015/0147495 A1    5/2015  Kumar et al.
2019/0204467 A1*   7/2019  Curt ...................... E21B 47/13
2022/0134794 A1*   5/2022  Loginov ............... H01F 7/0273
                                                   283/82

FOREIGN PATENT DOCUMENTS

CN       204252956 U   *   4/2015
WO       2017030596 A1    2/2017

OTHER PUBLICATIONS

Figure—"Water molecules and their interaction with salt", downloaded on Apr. 24, 2023 from [https://www.usgs.gov/media/images/water-molecules-and-their-interaction-salt-molecules].

Alabi, A. et al., "Advances in anti-scale magnetic water treatment", Environmental Science Water Research & Technology, 2015, 1, pp. 408-425.

Search Report and Written Opinion of International Patent Application No. PCT/US2020/055699 dated Jul. 5, 2021, 10 pages.

* cited by examiner

Magnetic Field (MF) Techniques
800

MF Anti-Scaling
814

MF Controlled Release of Anti-Scaling Material
818

MF Positioning of Anti-Scaling Material
822

MF Guidance and/or Positioning of Components
826

MF Shielding
830

MF Aided Sensing
834

Fig. 8

DOWNHOLE SCALE MITIGATION COMPONENT

BACKGROUND

Scale can detrimentally impact various types of equipment and operations.

SUMMARY

A downhole component can include a support body that includes a surface that defines at least a portion of a fluid passage; a composite matrix for scale mitigation supported by the surface of the support body where the composite matrix includes a lattice material that defines a lattice and magnetic material disposed in interstices of the lattice; and a cover layer disposed on the composite matrix. A method can include providing a support body of a downhole component, where the support body includes a surface that defines at least a portion of a fluid passage; forming a composite matrix for scale mitigation that is supported by the surface of the support body where the composite matrix includes a lattice material that defines a lattice and magnetic material disposed in interstices of the lattice; and forming a cover layer on the composite matrix. A method can include forming a composite matrix where the composite matrix includes a lattice material that defines a lattice and magnetic material disposed in interstices of the lattice; and assembling a downhole component that includes the composite matrix for scale mitigation supported by a support body, where the support body includes a surface that defines at least a portion of a fluid passage of the downhole component.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 8 illustrates examples of techniques.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Scale can be a deposit or coating formed on a surface of material, which may be a metallic material, rock, etc. Scale can be caused by one or more processes. For example, consider one or more of precipitation due to a chemical reaction with a surface of material, precipitation caused by one or more chemical reactions, a change in pressure, a change in temperature, a change in composition of a solution, etc. As an example, scale may be formed via a corrosion process (e.g., a corrosion process, etc.). As to types of chemicals that may form or be in scale, consider one or more of calcium carbonate, calcium sulfate, barium sulfate, strontium sulfate, iron sulfide, iron oxides, iron carbonate, various silicates and phosphates and oxides, various compounds insoluble or slightly soluble in water, etc.

As an example, scale can be a mineral salt deposit that may occur on tubing or other components as saturation of produced water is affected by changing conditions. Scale may create a restriction, or even a plug, in tubing. As to removal of scale, various types of mechanical, chemical and/or scale inhibitor treatment options may be available.

Figure 1:
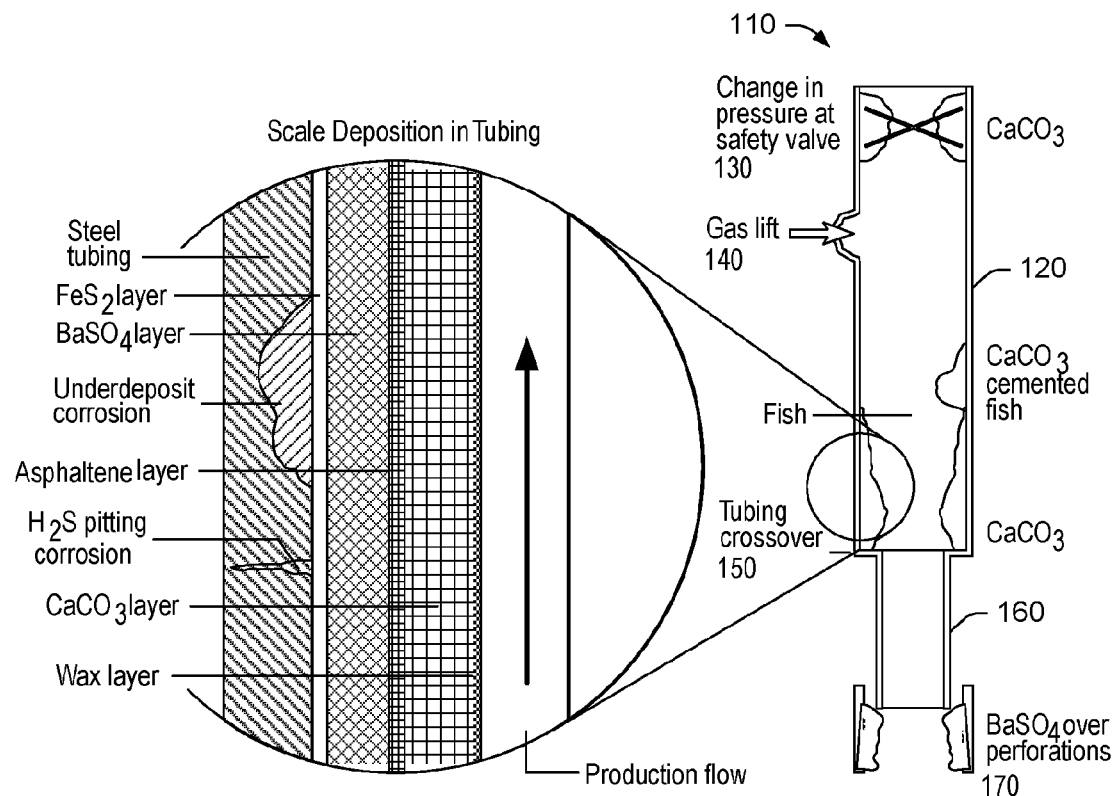
FIG. 1 illustrates an example of a system.

FIG. 1 shows an example of a system that includes a tubular assembly 110 that includes a tubing 120, a valve 130, gas-lift equipment 140, a tubing crossover 150, another tubing 160 (e.g., of a diameter that differs from the tubing 120) and perforations 170, which may be in a tubular, a liner, etc. In the example of FIG. 1, the tubular assembly 110 may be utilized for collecting fluid from a reservoir via the perforations 170 where the gas-lift equipment 140 can help move the fluid to a surface location, for example, for processing. In the example of FIG. 1, various portions of the tubular assembly 110 may be subjected to scaling (e.g., scale formation).

Scale can occur on various time scales. Under some conditions, scale may form in tubing of a production well within a day to an extent that production drops by more than ten percent. In a North Sea production well in the Miller field, production fall from approximately 30,000 B/D (4770 m$^3$/d) to approximately zero in 24 hours. Scale can develop in formation pores near a wellbore and reduce formation porosity and permeability. Scale can block flow by clogging perforations or by forming a thick lining in production tubing. Scale can coat and damage downhole equipment, such as, for example, valves, gas-lift mandrels, etc.

Scale-removal techniques can involve shutting down production, moving in a workover rig to pull damaged tubing out of a well, treating for scale at the surface of a well, replacing tubing, etc.

As mentioned, FIG. 1 shows some examples of scale. The location of scale deposits in tubing can vary from downhole perforations 170 to the surface where it constrains production through tubing restrictions, blacked nipples, fish, valves 130 and gas-lift equipment 140. Scale may be layered and sometimes covered with a waxy or asphahene coating (insaft). Pitting and corrosion on steel can develop under scale, for example, due to bacteria and sour gas, which can diminish steel integrity (e.g., weaken steel tubing).

In FIG. 1, fish can refer to one or more items in a wellbore. Fish can be junk metal, a hand tool, a length of drillpipe or drill collars, or an expensive MWD and directional drilling package. A lost or damage component may be referred to as "the fish", As equipment put into a wellbore tends to be accurately measured and sketched, an appropriate fishing tool may be selected if the equipment is to be fished out of the hole.

As to some examples of scale, consider carbonates (e.g., Ca(II), Mg(II), and Fe(II)), sulfates (e.g., Ca(II), Ba(II), Sr(II), and Ra(II)), oxides and hydroxides (e.g., Fe(II), Fe(III), Mg(II) and Cu(II)), sulfides (e.g., Fe(II), Cu(II) and Zn(II)), sodium chloride (NaCl), etc.

As to carbonate scales, calcium carbonate scale tends to be common in oil field well environments (e.g., North Sea, etc.). Various deposits can include calcite, which tends to be a relatively thermodynamically stable crystalline polymorph of $CaCO_3$. Aragonite and vaterite are two polymorphs in order of decreasing thermodynamic stability. While the foregoing crystals have the chemical formula $CaCO_3$, they differ in crystal structure. Other known minerals include magnesite ($MgCO_3$) and iron carbonate siderite ($FeCO_3$). Formation water may have a concentration of 200,000-250,000 mg/l TDS and where mineral composition can have a complex dependence on mineral digenesis. In carbonate and calcite cemented sandstone reservoirs, there tends to be a high concentration of divalent calcium (Ca+) and magnesium (Mg+) ions. Scale tends to occur responsive to a change in the chemistry equilibrium. Interactions in chemistry can be complex; noting the following phenomena can be helpful in understanding scale deposition: Carbon dioxide dissolves in water to form carbonic acid and carbonic acid dissociates to form carbonate and bicarbonate, and, by Le Chatelier's principle, a reaction will move to the right with respect to the flowing equilibrium equation, in attempt to increase the pressure by forming more $CO_2$ gas: $2HCO^{3-}=CO_3^{2-}+H_2O+CO_2$. Precipitation can produce a further pressure drop, leading to further precipitation. As a result of such a reaction, pH tends to increase and calcium carbonate can become supersaturated enough to precipitate. The kinetics of the reaction can be a function of temperature. As explained, various chemical reactions can be linked where a parameter may affect one or more other parameters: $Ca^{2+}+CO_3^{2-}=CaCO_3(s)$.

Carbonate scale can occur at points where there is a pressure drop, which can be at one or more points in a system. For example, it can be downstream, at topside, at a choke valve, a safety valve, etc. Calcium carbonate tends not to deposit in a well due to a $CO_2$ high concentration and hence a low pH value. However, it may occur in a producing well responsive to pressure decline.

As explained, scaling can pose various challenges, particularly in production, whether downhole, subsea, etc. Scaling can impact hydrocarbon production, particularly in deepwater, high pressure and high temperature (HPHT) production, and can be a differentiator for oil service companies and tool manufacturers.

As explained, various types of scale and scaling mechanisms exist. When involving salts in water, as often the case in hydrocarbon production, scaling is caused by the inverse solubility of salts that have recrystallized from solution onto equipment surfaces. Scaling can occur as a result of changes in water composition (e.g., water mingling), pH, temperature, pressure, outgassing, etc. (e.g., a parameter or parameters that can influence salt solubility).

As explained with respect to the example system 100 of FIG. 1, calcium carbonate can be a common constituent of scales, particularly in high-temperature $CO_2$ wells. And, as mentioned, other scales forming salts may include one or more of magnesium carbonate, calcium sulfate, barium sulfate, strontium sulfate, iron carbonate, iron sulfide, among others. Such scale forming salts can be originating from rocks in contact with subterranean hydrocarbon and/or water. Sulfate scales can be characteristic of reservoir water mingling; having been observed at sand screens, among others.

Figure 2:
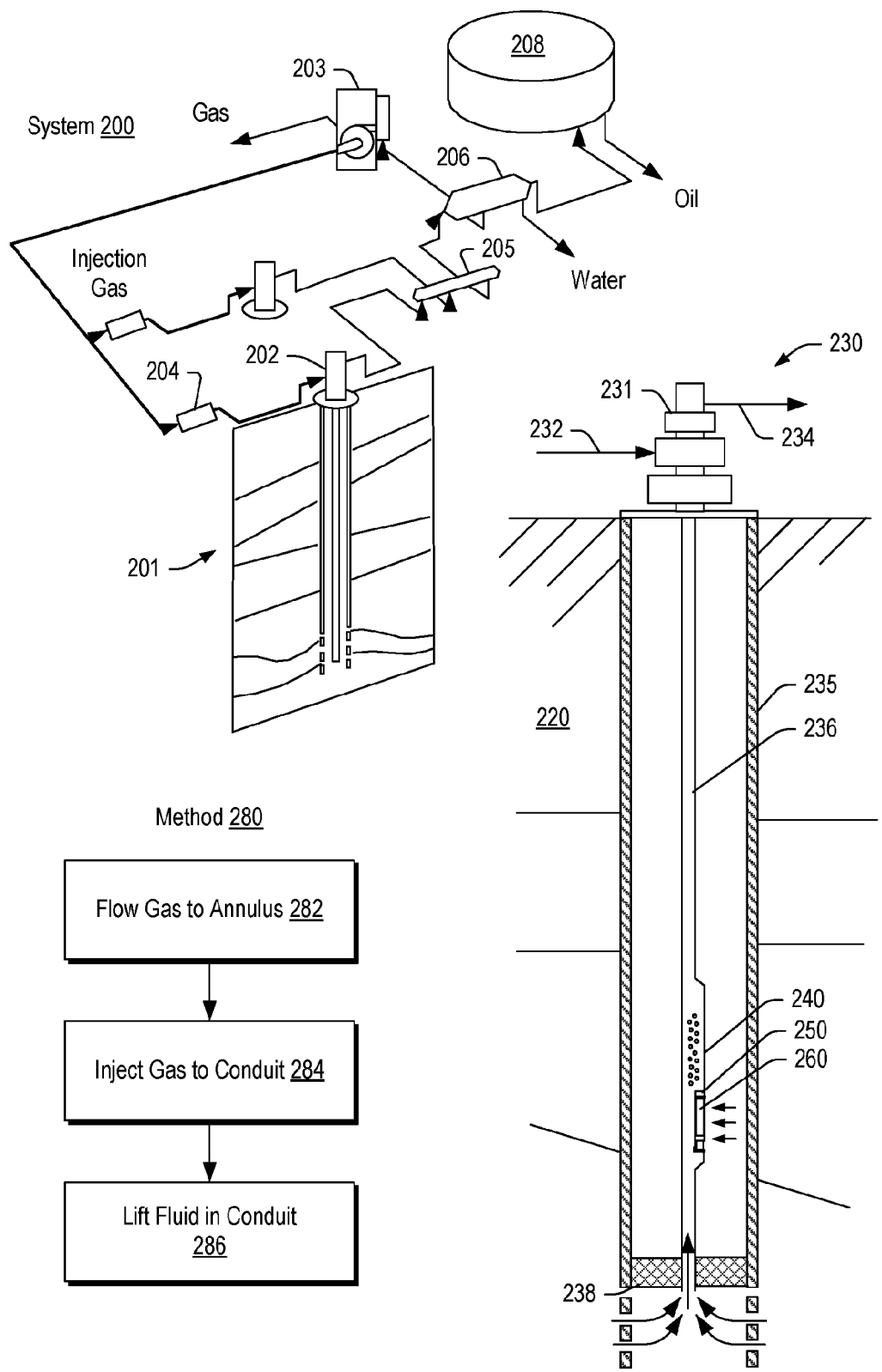
FIG. 2 illustrates an example of a system and an example of a method.

FIG. 2 shows an example of a system 200 that includes various types of equipment where at least some of the equipment may scale and/or affect a scaling mechanism. As mentioned with respect to FIG. 1, the gas-lift equipment 140 can experience scale formation and, for example, may alter one or more of pressure, temperature, chemistry, phase dynamics, etc.

Gas lift is a process where, for example, gas may be injected from an annulus into tubing. An annulus, as applied to an oil well or other well for recovering a subsurface resource may refer to a space, lumen, or void between piping, tubing or casing and the piping, tubing, or casing immediately surrounding it, for example, at a greater radius.

As an example, injected gas may aerate well fluid in production tubing in a manner that "lightens" the well fluid such that the fluid can flow more readily to a surface location. As an example, one or more gas lift valves may be configured to control flow of gas during an intermittent flow or a continuous flow gas lift operation. As an example, a gas lift valve may operate based at least in part on a differential pressure control that can actuate a valve mechanism of the gas lift valve.

As gas lift valve may include a so-called hydrostatic pressure chamber that, for example, may be charged with a desired pressure of gas (e.g., nitrogen, etc.). As an example, an injection-pressure-operated (IPO) gas lift valve or an unloading valve can be configured so that an upper valve in a production string opens before a lower valve in the production string opens.

As an example, a gas lift valve may be configured, for example, in conjunction with a mandrel, for placement and/or retrieval of the gas lift valve using a tool. For example, consider a side pocket mandrel that is shaped to allow for installation of one or more components at least partially in a side pocket or side pockets where a production flow path through the side pocket mandrel may provide for access to a wellbore and completion components located below the side pocket mandrel. As an example, a side pocket mandrel can include a main axis and a pocket axis where the pocket axis is offset a radial distance from the main axis. In such an example, the main axis may be aligned with production tubing, for example, above and/or below the side pocket mandrel.

As an example, a tool may include an axial length from which a portion of the tool may be kicked-over (e.g., to a kicked-over position). In such an example, the tool may include a region that can carry a component such as a gas lift valve. An installation process may include inserting a length of the kickover tool into a side pocket mandrel (e.g., along a main axis) and kicking over a portion of the tool that carries a component toward the side pocket of the mandrel to thereby facilitate installation of the component in the side pocket. A removal process may operate in a similar manner, however, where the portion of the tool is kicked-over to facilitate latching to a component in a side pocket of a side pocket mandrel.

Where gas lift equipment is damaged by scale, one or more remedial operations may be performed; whereas, if left unmitigated, fluid production may decrease and it may be difficult to implement one or more tools (e.g., kickover tool, etc.).

In FIG. 2, the system 200 is shown with an example of a geologic environment 220 that includes equipment and an example of a method 280. The system 200 includes a subterranean formation 201 with a well 202. Injection gas is provided to the well 202 via a compressor 203 and a regulator 204. The injection gas can assist with lifting fluid that flows from the subterranean formation 201 to the well 202. The lifted fluid, including injected gas, may flow to a manifold 205, for example, where fluid from a number of wells may be combined. As shown in the example of FIG. 2, the manifold 205 is operatively coupled to a separator 206, which may separate components of the fluid. For example, the separator 206 may separate oil, water and gas components as substantially separate phases of a multiphase fluid. In such an example, oil may be directed to an oil storage facility 208 while gas may be directed to the compressor 203, for example, for re-injection, storage and/or transport to another location. As an example, water may be directed to a water discharge, a water storage facility, etc.

As shown in FIG. 2, the geologic environment 220 is fitted with well equipment 230, which includes a well-head 231 (e.g., a Christmas tree, etc.), an inlet conduit 232 for flow of compressed gas, an outlet conduit 234 for flow of produced fluid, a casing 235, a production conduit 236, and a packer 238 that forms a seal between the casing 235 and the production conduit 236. As shown, fluid may enter the casing 235 (e.g., via perforations) and then enter a lumen of the production conduit 236, for example, due to a pressure differential between the fluid in the subterranean geologic environment 220 and the lumen of the production conduit 236 at an opening of the production conduit 236. Where the inlet conduit 232 for flow of compressed gas is used to flow gas to the annular space between the casing 235 and the production conduit 236, a mandrel 240 operatively coupled to the production conduit 236 that includes a pocket 250 that seats a gas lift valve 260 that may regulate the introduction of the compressed gas into the lumen of the production conduit 236. In such an example, the compressed gas introduced may facilitate flow of fluid upwardly to the well-head 231 (e.g., opposite a direction of gravity) where the fluid may be directed away from the well-head 231 via the outlet conduit 234.

As shown in FIG. 2, the method 280 can include a flow block 282 for flowing gas to an annulus (e.g., or, more generally, a space exterior to a production conduit fitted with a gas lift valve), an injection block 284 for injecting gas from the annulus into a production conduit via a gas lift valve or gas lift valves and a lift block 286 for lifting fluid in the production conduit due in part to buoyancy imparted by the injected gas.

As an example, where a gas lift valve includes one or more actuators, such actuators may optionally be utilized to control, at least in part, operation of a gas lift valve (e.g., one or more valve members of a gas lift valve). As an example, surface equipment can include one or more control lines that may be operatively coupled to a gas lift valve or gas lift valves, for example, where a gas lift valve may respond to a control signal or signals via the one or more control lines. As an example, surface equipment can include one or more power lines that may be operatively coupled to a gas lift valve or gas lift valves, for example, where a gas lift valve may respond to power delivered via the one or more power lines. As an example, a system can include one or more control lines and one or more power lines where, for example, a line may be a control line, a power line or a control and power line.

As an example, a production process may optionally utilize one or more fluid pumps such as, for example, an electric submersible pump (e.g., consider a centrifugal pump, a rod pump, etc.). As an example, a production process may implement one or more so-called "artificial lift" technologies. An artificial lift technology may operate by adding energy to fluid, for example, to initiate, enhance, etc. production of fluid.

Figure 3:
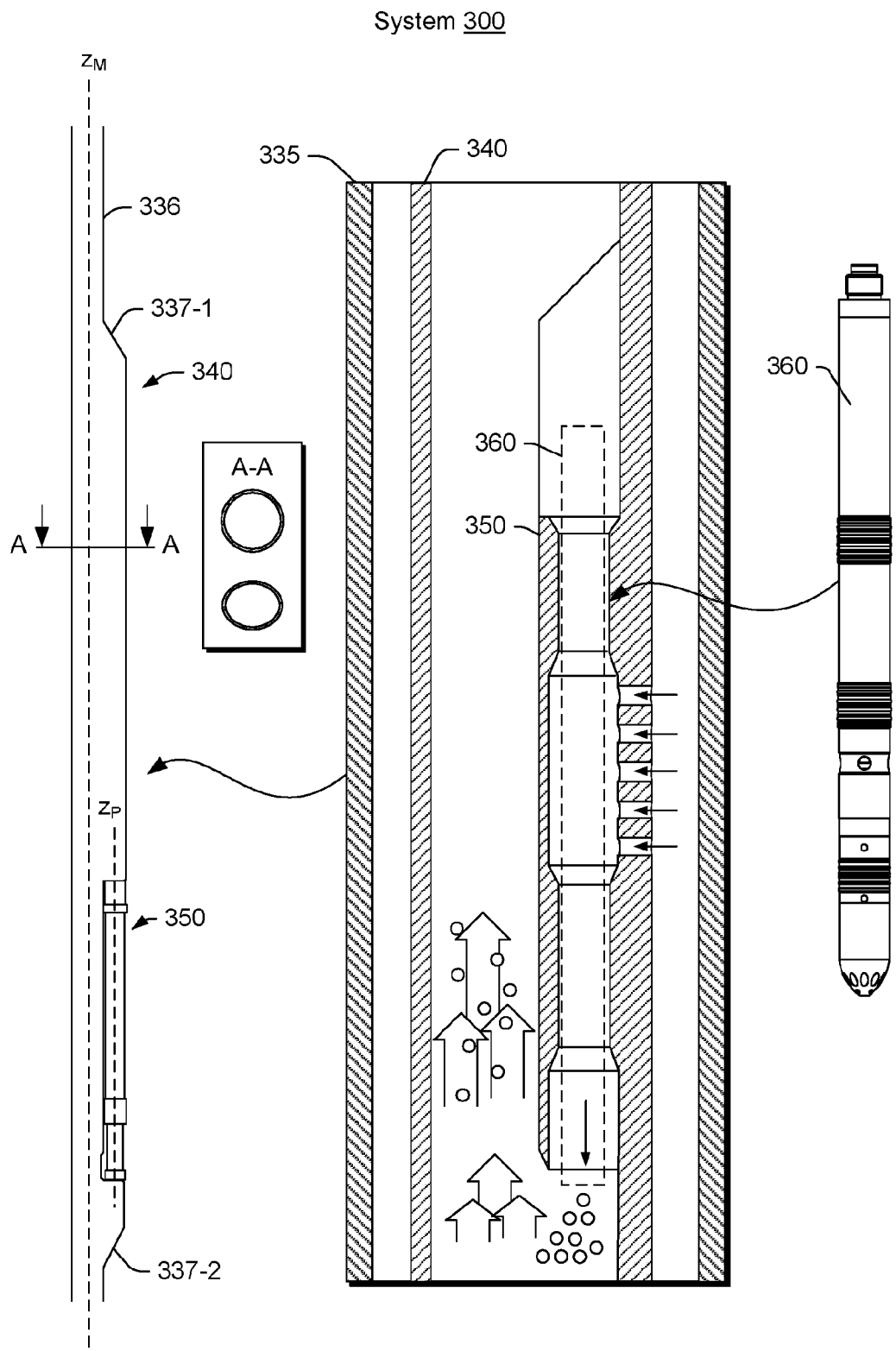
FIG. 3 illustrates an example of a system.

FIG. 3 shows an example of a system 300 that includes a casing 335, a production conduit 336 and a mandrel 340 that includes a pocket 350 that seats a gas lift valve 360. As shown, the mandrel 340 can include a main longitudinal axis ($z_M$) and a side pocket longitudinal axis ($z_P$) that is offset a radial distance from the main longitudinal axis ($z_M$). In the example of FIG. 3, the axes ($z_M$ and $z_P$) are shown as being substantially parallel such that a bore of the pocket 350 is parallel to a lumen of the mandrel 340. Also shown in FIG. 3 are two examples of cross-sectional profiles for the mandrel 340, for example, along a line A-A. As shown, a mandrel may include a circular cross-sectional profile or another shaped profile such as, for example, an oval profile.

As an example, a completion may include multiple instances of the mandrel 340, for example, where each pocket of each instance may include a gas lift valve where, for example, one or more of the gas lift valves may differ in one or more characteristics from one or more other of the gas lift valves (e.g., pressure settings, etc.).

As shown in the example of FIG. 3, the mandrel 340 can include one or more openings that provide for fluid communication with fluid in an annulus (e.g., gas and/or other fluid), defined by an outer surface of the mandrel 340 and an inner surface of the casing 335, via a gas lift valve 360 disposed in the pocket 350. For example, the gas lift valve 360 may be disposed in the pocket 350 where a portion of the gas lift valve 360 is in fluid communication with an annulus (e.g., with casing fluid) and where a portion of the gas lift valve 360 is in fluid communication with a lumen (e.g., with tubing fluid). In such an example, fluid may flow from the annulus to the lumen (e.g., bore) to assist with lift of fluid in the lumen or, for example, fluid may flow from the lumen to the annulus. The pocket 350 may include an opening that may be oriented downhole and one or more openings that may be oriented in a pocket wall, for example, directed radially to a lumen space. As an example, the pocket 350 may include a production conduit lumen side opening (e.g., an axial opening) for placement, retrieval, replacement, adjustment, etc. of a gas lift valve. For example, through use of a tool, the gas lift valve 360 may be accessed. As an example, where a gas lift valve includes circuitry such as a battery or batteries, a tool may optionally provide for charging and/or replacement of a battery or batteries.

In the example of FIG. 3, gas is illustrated as entering from the annulus to the gas lift valve 360 as disposed in the pocket 350. Such gas can exit at a downhole end of the gas lift valve 360 where the gas can assist in lifting fluid in the lumen of the mandrel 340 (e.g., as supplied via a bore of production tubing, etc.).

As an example, a side pocket mandrel may be configured with particular dimensions, for example, according to one or more dimensions of commercially available equipment. As an example, a side pocket mandrel may be defined in part by a tubing dimension (e.g., tubing size). For example, consider tubing sizes of about 2.375 in (e.g., about 60 mm), of about 2.875 in (e.g., about 73 mm) and of about 3.5 in (e.g., about 89 mm). As to types of valves that may be suitable for installation in a side pocket mandrel, consider dummy valves, shear orifice valves, circulating valves, chemical injection valves and waterflood flow regulator valves. As an example, a side pocket may include a bore configured for receipt of a device that includes an outer diameter of about 1 in (e.g., about 25 mm), or about 1.5 in. (e.g., about 37 mm) or more. As mentioned, a running tool, a pulling tool, a kickover tool, etc. may be used for purposes of installation, retrieval, adjustment, etc. of a device with respect to a side pocket. As an example, a tool may be positionable via a slickline technique.

As an example, a side pocket mandrel may include a circular and/or an oval cross-sectional profile (e.g., or other shaped profile). As an example, a side pocket mandrel may include an exhaust port (e.g., at a downhole end of a side pocket).

As an example, a mandrel may be fit with a gas lift valve that may be, for example, a valve according to one or more specifications such as an injection pressure-operated (IPO) valve specification. As an example, a positive-sealing check valve may be used such as a valve qualified to meet API-19G1 and G2 industry standards and pressure barrier qualifications. For example, with a test pressure rating of about 10,000 psi (e.g., about 69,000 kPa), a valve may form a metal-to-metal barrier between production tubing and a casing annulus that may help to avoid undesired communication (e.g., or reverse flow) and to help mitigate risks associated with gas lift valve check systems.

Figure 4:
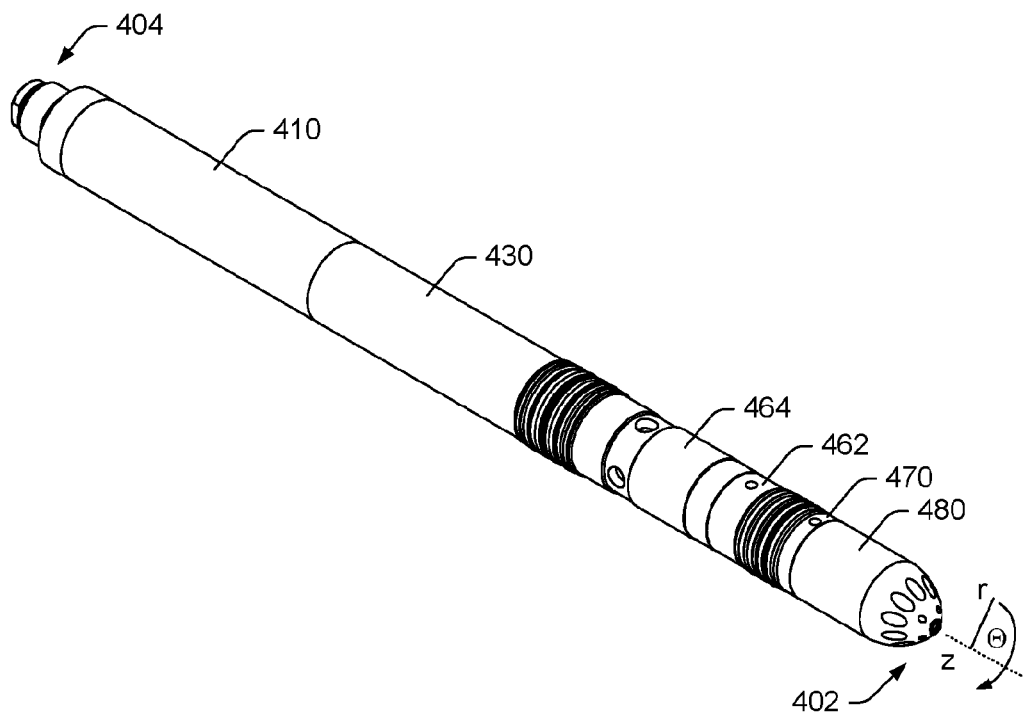
FIG. 4 illustrates an example of a gas lift valve.

FIG. 4 shows an example of a gas lift valve 400 that includes a gas outlet end 402, a tool end 404, a control gas chamber section 410, a bellows valve mechanism section 430, a coupling 462, a gas inlet section 464, a coupling 470 and a gas outlet section 480. Various features of the gas lift valve 400 may be described with respect to a cylindrical coordinate system (e.g., r, z, Θ) where, for example, a z-axis represents a longitudinal axis of the gas lift valve 400, a r-axis represents a distance from the z-axis (e.g., radially outwardly) and an azimuthal angle (Θ) represents an azimuthal position of a feature, for example, with respect to a feature that may be deemed to be at 0 degrees (e.g., a reference feature such as an opening, etc.).

In the example of FIG. 4, the gas lift valve 400 can include a plurality of seal elements, for example, to seal against a bore of a mandrel in which at least a portion of the gas lift valve 400 may be disposed. As an example, a seal element or seal elements may act to form a seal between an outer surface of a gas lift valve and an inner surface of a bore of a mandrel where such a seal may be disposed between a gas inlet opening and a gas outlet opening of the gas lift valve. As an example, seal elements may be ring shaped and, for example, at least in part seated in one or more annular grooves of an outer surface of a gas lift valve. As an example, a gas lift valve can include a plurality of internal seal elements.

Figure 5A:
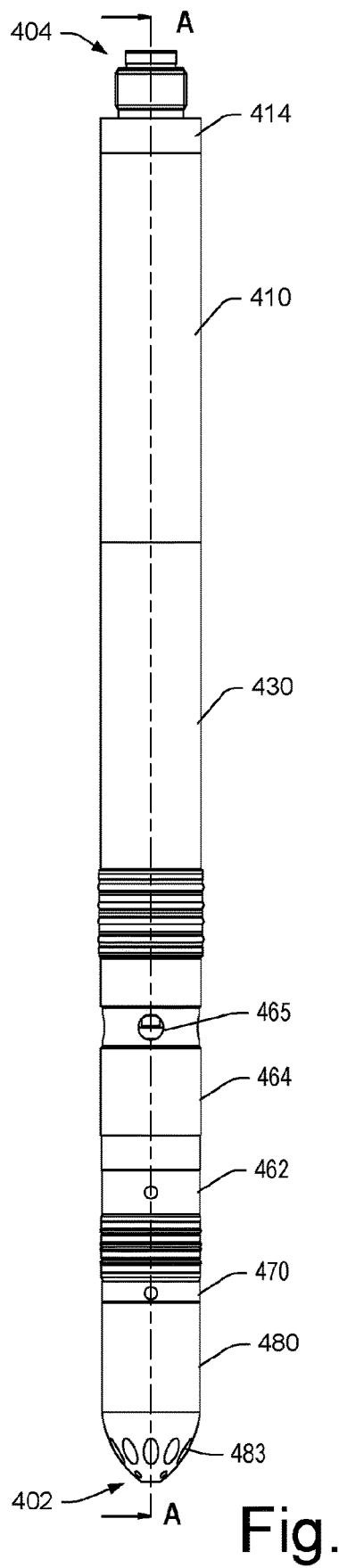
FIGS. 5A and 5B illustrate the gas lift valve of FIG. 4.
Figure 5B:
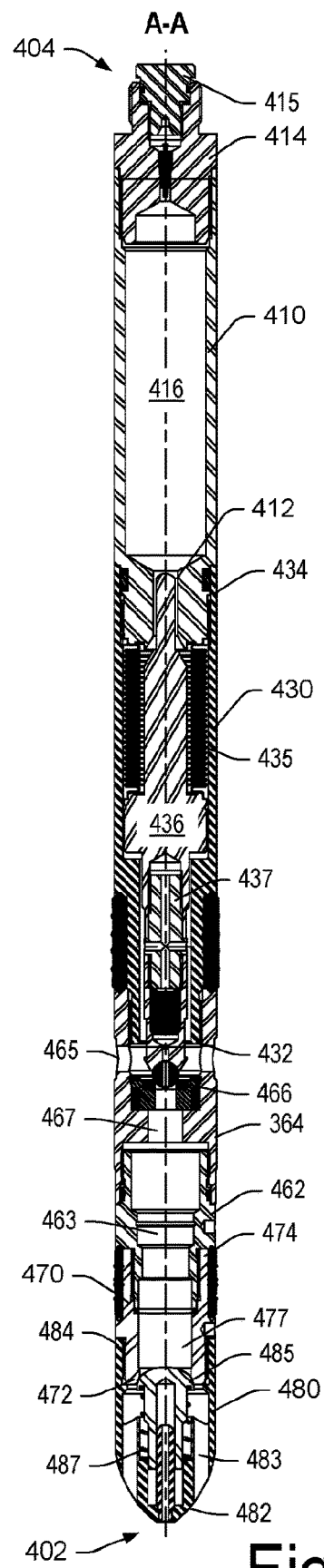

FIG. 5A shows a side view of the gas lift valve 400 and FIG. 5B shows a cutaway view of the gas lift valve 400 along a line A-A. As shown in FIG. 5A, the gas inlet section 464 includes at least one opening 465 as a gas inlet (see, e.g., the arrangement of FIG. 3) and the gas outlet section 480 includes at least one opening 483 as a gas outlet.

FIG. 5B shows the control gas chamber section 410 as including a piston bore 412 and a plug 414 at opposing ends of a gas chamber 416, which may be charged with gas such as nitrogen. In the example of FIG. 5B, a seal plug 415 may be utilized to seal a passage in the plug 414, for example, after charging the gas chamber 416 to a desired gas pressure.

FIG. 5B shows the bellows valve mechanism section 430 as including opposing ends 432 and 434, a bellows 435, a piston 436 and a valve member 437. In the example of FIG. 4B, the bellows 435 may be sealed with respect to the bellows 435 and the chamber 416. In such an example, the one or more openings 465 of the gas inlet section 464 can communicate gas pressure that can act upon the valve member 437. In such an example, where the pressure is sufficiently high (e.g., with respect to pressure in the chamber 416), force exerted may cause the valve member 437 and the piston 436 to translate toward the chamber 416. In such an example, the valve member 437 may retract from a valve seat 466 that is supported by the gas inlet section 464. As shown, the valve seat 466 is annular such that an opening defined thereby can allow for flow of gas to a bore 467 of the gas inlet section 464.

In the example of FIG. 5B, the coupling 462 includes a bore 463 that is in fluid communication with the bore 467 and that is in fluid communication with a bore 477 of the coupling 470 such that gas pressure can act upon a check valve member 485 supported by the gas outlet section 480, which may be seated against an end 472 of the coupling 470, which has an opposing end 474. For example, the check valve member 485 may include a translatable dome shape that can seat against an annular check valve seat defined by the end 472 of the coupling 470.

In the example of FIG. 5B, the check valve member 485 can be biased by a biasing member 487, which may be, for example, a spring. Where gas pressure in the bore 477 of the coupling 470 is sufficiently high, force acting on the check valve member 485 may cause compression of the biasing member 487 and translation of the check valve member 485 downwardly away from the gas inlet section 464 such that the one or more openings 465 of the gas inlet section 464 become in fluid communication with the one or more openings 483 of the gas outlet section 480.

As an example, the check valve member 485 may be referred to as a dart. As an example, the check valve member 485 may be considered to be a low-pressure valve member; whereas, the valve member 437 may be considered to be a high-pressure valve member. As an example, a valve member can include a ball that can be seated in a valve seat to plug an opening in the valve seat.

As explained, fluid can flow in various types of equipment, which may include one or more fluid passages, which may range in a cross-section dimension from 0.1 cm to 30 cm (e.g., consider a diameter of 0.1 cm to a diameter of 30 cm). Scale formation in a fluid passage can be detrimental to one or more operations, which may include equipment operation (e.g., gas lift valve, etc.) to production operation (e.g., production of hydrocarbons, etc.). Scale buildup can render equipment inoperable and costly to remediate or remove. As mentioned, scale building in side-pocket mandrel can be detrimental, where scale formed may diminish cross-section of a passage (e.g., a tool passage, a fluid passage, etc.).

Figure 6:
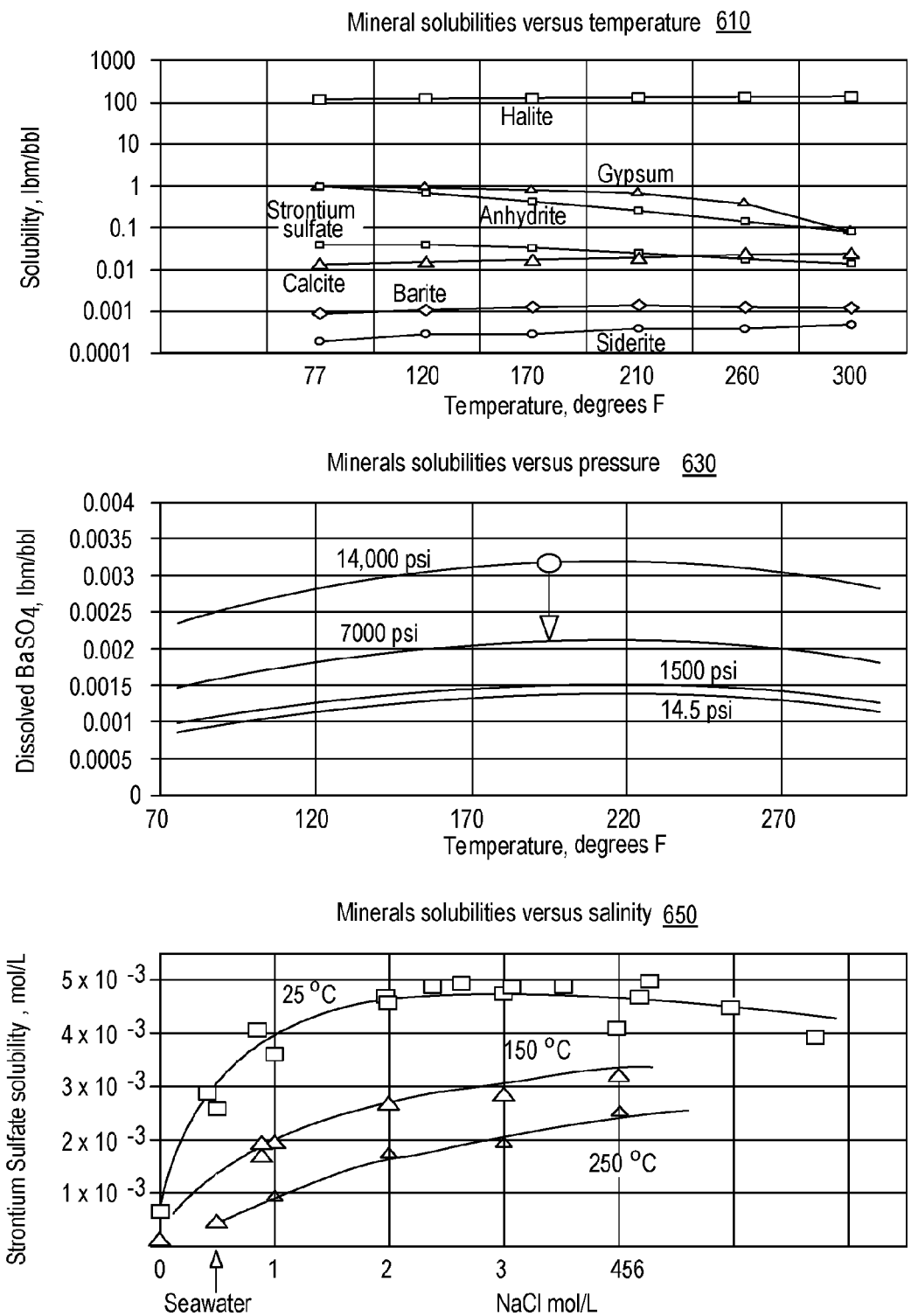
FIG. 6 illustrates examples of plots.

FIG. 6 shows example plots 610, 630 and 650. The plot 610 shows solubility versus temperature in degrees F. for various examples of minerals, including halite, gypsum, anhydrite, strontium sulfate, calcite, barite and siderite. The plot 630 shows dissolved $BaSO_4$ versus temperature in degrees F. at various pressures. As shown, the concentration of the dissolved $BaSO_4$ can be increased with increasing pressure or, in other words, a drop-in pressure may cause precipitation of $BaSO_4$. The plot 650 shows strontium sulfate solubility versus sodium chloride concentration where solubility of strontium sulfate may generally decrease with respect to an increase in temperature though NaCl concentration presents a relatively complex relationship. As shown in the example plots 610, 630 and 650 of FIG. 6, mineral solubility can have a complex dependency on one or more factors, which can include, for example, one or more of temperature, pressure and salinity. As mentioned, various types of equipment may cause one or more changes in conditions that may affect solubility and hence scale formation.

Figure 7:
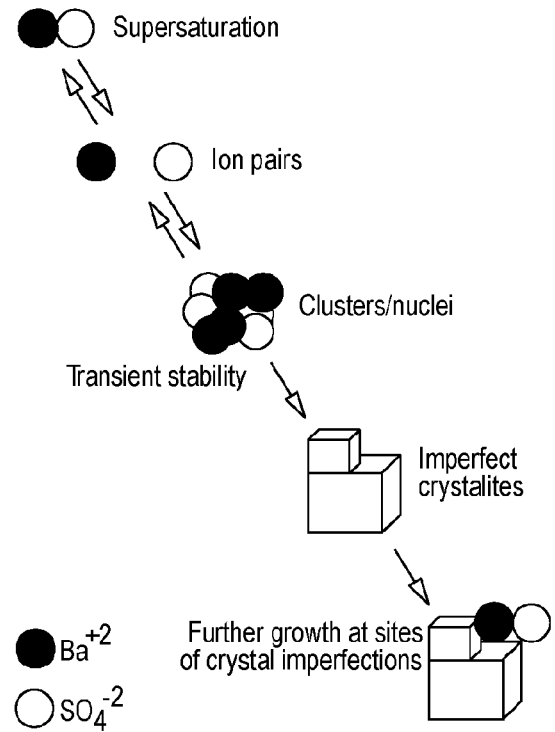
FIG. 7 illustrates examples of processes.
Figure 7:
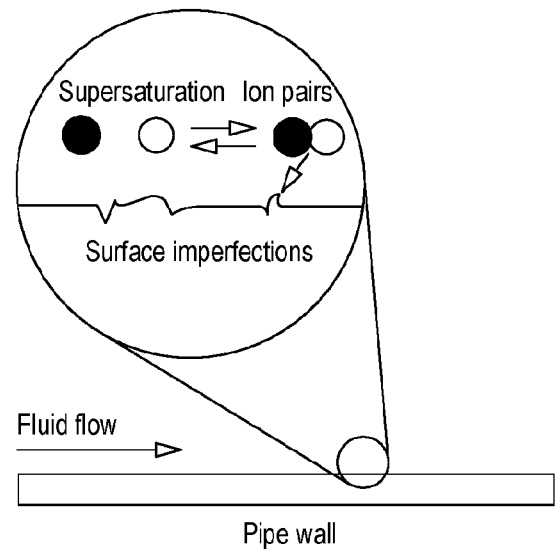

FIG. 7 shows example graphics 710 and 730 of various phenomena. In particular, the graphic 710 shows an example of homogeneous nucleation for an example mineral (e.g., $BaSO_4$ formed of the cation $Ba^{+2}$ and the anion $SO_4^{-2}$) and the graphic 730 shows an example of heterogeneous nucleation for an example ion pair with respect to a surface of a pipe wall (e.g., tubing). As an example, scale growth may commence in a supersaturated solutions with ion pairs forming single crystals in solution, called homogeneous nucleation (see, e.g., the graphic 710) and, for example, scale may grow on preexisting surface defects such as, for example, rough spots on a liquid-tubing surface, called heterogeneous nucleation (see, e.g., the graphic 730).

As explained, scale deposits can result in various types of issues that can impact operations. Scale may be addressed via various types of chemical treatments, which may have associated concerns, demand particular equipment, etc. As to non-chemical water treatment technologies, magnet field and/or electromagnetic field equipment may be employed, alone or optionally in addition to one or more other technologies (e.g., scale inhibitors, anti-scalants, mechanical, etc.). Magnetic field and/or electromagnetic field technologies may be referred to as MF techniques as, in either instance, a magnetic field is present.

As an example, a system, an assembly, a device, etc., can include one or more components that form a magnetic field (MF) emitting structure. In such an example, the MF emitting structure may be suitable for oilfield scale mitigation. As an example, a method of manufacture may involve using additive and/or subtractive technologies. As an example, a method of using a MF emitting structure may include performing one or more operations, which may include one or more of manual, semi-automated and automated operations.

Various types of equipment can include MF capabilities. For example, consider one or more of tubings, valves, ports, mandrels, perforations, etc. As an example, a tubing such as a pressure sub (e.g., a cylindrical, semi-cylindrical, annular, oval, etc.) or a port of a subterranean tool assembly can include one or more components that can generate one or more localized magnetic fields. In such an example, the fields may be oriented with respect to flow such as, for example, normal to a flow vector. A component may be a permanent magnet that can emit a magnetic field where the magnetic field can be defined with respect to a north pole and a south pole. As an example, shielding may be included such that a magnetic field is constrained or otherwise localized. As an example, shielding may be to diminish impact of a magnetic field on one or more tools, etc. For example, consider a tool that can make magnetic field measurements or that may otherwise be sensitive to a magnetic field (e.g., other than the Earth's magnetic field, etc.). As an example, a component (e.g., or a tool, a tubing, etc.) may be orientable such that a magnetic field is oriented in a particular manner. For example, consider a valve that can be disposed in a pocket in one or more orientations where one orientation may direct a magnetic field in a manner that it does not substantially reduce scaling or risk attracting magnetic particles and in another orientation that substantially reduces scaling with one or more features that may reduce attracting magnetic particles (e.g., ferromagnetic particles, debris, etc.). In such an example, a tool may be utilized for switching and/or one or more of electrical, hydraulic, pneumatic techniques.

As an example, a magnet field may be designed such that it extends into a flow stream to help mitigate scaling by keeping minerals in a bulk of the flow stream while being of a particular character near or at a surface such that ferromagnetic particles do not aggregate at the surface. As an example, a surface may be of particular properties such that ferromagnetic particles can be removed responsive to flow near a surface, noting that a surface boundary condition may specify a flow velocity of zero (e.g., a no slip condition).

As an example, a component can include one or more anti-scaling technologies. For example, consider a component that includes a specialized surface and one or more magnets. In such an example, the specialized surface may be specialized via one or more treatments, which may include mechanical, chemical, optical, etc., treatments. For example, a specialized surface may be embedded with a material that can be eluted where elution of the material can help to mitigate scaling. As an example, an elution rate may be controllable. For example, consider an elution process that depends on one or more of magnetic field strength and magnetic field gradient. As an example, a material may be directed in a particular direction by following a magnetic field gradient, which may be from weaker to stronger or stronger to weaker. In such an example, a magnetic field may be involved in multiple roles that can mitigate scaling (e.g., via presence of the magnetic field and via controlled release of an anti-scalant, etc.).

As to anti-scaling, as an example, a component may include a layer or layers that include particles where the particles include a shell that define a space for inclusion of one or more anti-scaling agents that may be controllably released through control of the shell. As another example, consider polymeric and inorganic microspheres. As yet another example, consider a particle with iron oxide nanoparticles (e.g., nano-in-microparticles, NIMs). As yet another example, consider Iron oxide NPs with grafted poly(styrene)-b-poly(acrylic acid) (PS-b-PAA) block copolymer that can be self-assembled into multilayer magnetovesicles (MVs) and utilized for incorporation of anti-scaling agents in a hollow cavity.

As an example, anti-scaling particles may be maintained in a particular region exposed to fluid through use of one or more magnetic fields generated by magnetic material of a downhole component. For example, consider a downhole component or assembly where particles can be released upstream a magnetic field where the particles enter the magnetic field such that their movement, motion, etc., is influenced (e.g., altered, etc.) by the magnetic field. In such an example, consider a chamber or chambers that can hold the particles and release the particles or a portion thereof with respect to time, for example, responsive to one or more downhole phenomena (e.g., fluid flow, pressure, temperature, chemical environment, etc.) and/or exposure to a magnetic field. As to the former and/or the latter, time of degradation of material may be controlled, for example, such that once degraded there can be release of at least some anti-scaling particles into a flow stream. As an example, anti-scaling particles or another form of anti-scaling material may be embedded in another material where degradation thereof results in release of the anti-scaling particles or anti-scaling material, which may be influenced by the presence of a magnetic field or magnetic fields directly and/or indirectly.

As an example of a microcapsule system, consider magnetic multilayer microcapsules composed of poly(allylamine hydrochloride) and poly(sodium 4-styrenesulfonate) and prepared by layer-by-layer (LbL) deposition. Such microcapsules may be utilized as magnetic delivery vehicles. For example, consider capsules that can be successfully trapped by a magnetic field (e.g., depending on fluid forces, etc.). In such an example, a magnetic field may be suitable for maintaining relative positions of microcapsules at a surface of a downhole component, in a flow stream, etc., where the microcapsules may include one or more anti-scaling agents that can be eluted to reduce scaling and/or where the microcapsules act to modify the magnetic field in a manner that provides for more effective anti-scaling (e.g., magnetic field shaping, localizations, etc.).

Depending on the configuration of a component, a magnetic field may provide for an accelerated release of an agent such as an anti-scaling agent. For example, without a magnetic field, a material embedded in a component may have slow or no release characteristics; whereas, upon exposure to a magnetic field (e.g., greater than the Earth's magnetic field by at least two orders of magnitude), the material can be released. In such an example, a component may be part of an assembly where the component does not elute material until it is positioned in proximity to a magnetic field, which may be, for example, upon installation of the component and/or one or more magnets in a downhole environment.

As an example, consider a valve and a mandrel with a pocket where the valve and the mandrel can interact for controlled release of one or more anti-scaling agents and/or for generation of one or more anti-scaling characteristics. As mentioned, a magnetic field by itself may provide for some amount of anti-scaling. As explained, a magnetic field may provide for an additional effect such as an effect that causes or controls release of an anti-scaling agent (e.g., an anti-scalant, etc.). As to the valve and mandrel example, consider a valve with one or more magnets and a mandrel with one or more embedded materials that include an anti-scaling material. In such an example, once the valve is positioned at least in part in a pocket of the mandrel, a magnet field or magnetic fields may provide for anti-scaling and/or release of one or more anti-scaling materials.

As an example, a valve and mandrel assembly may include magnetic positioning and/or locking. For example, a valve can include one or more magnets and a mandrel can include one or more magnets where the magnets can guide and/or secure the valve into a desired position with respect to the mandrel (e.g., via magnetic attraction and/or repulsion). In such an example, the magnets may also provide for anti-scaling, for example, via their magnetic fields and/or via controlled release of one or more anti-scaling materials (e.g., as may be embedded in, carried by, or flowable to the valve and/or the mandrel).

FIG. 8 shows various examples of magnetic field (MF) techniques 800, which can include MF anti-scaling 814, MF controlled release of anti-scaling material (e.g., anti-scaling agent, surface renewal, etc.) 818, MF positioning of anti-scaling material 822, MF guidance and/or positioning of components 826, MF shielding 830, and MF aided sensing 834.

As to MF aided sensing 834, consider using a magnetic field or magnetic fields generated by a downhole component for making one or more types of measurements. For example, consider making one or more nuclear magnetic resonance (NMR) types of measurements. In such an example, where a magnetic field exists downhole, a probe may be positioned in the magnetic field (e.g., optionally guided by the magnetic field to be in a relatively homogenous portion of the magnetic field) for making NMR measurements. In such an example, the magnetic field can provide for anti-scaling and optionally MF aided sensing.

As an example, an anti-scaling technique can make use of turbulent flow or other types of flow that may exhibit mixing, eddies, etc. For example, consider a magnetic field that has a magnetic field gradient where particles may be introduced into the flow and be moved by the flow behavior such that they experience a time-dependent magnetic field strength, which may be analogous to a type of time-varying electromagnetic filed. In such an example, the particles may experience forces that result in heating and/or one or more other phenomena, which may be suitable for controlling release of an anti-scaling material, etc. For example, consider particles with magnetic nanoparticles and encapsulated anti-scalant in microspheres where the microspheres heat up responsive to experiencing a magnetic field gradient (e.g., relative time-varying magnetic field), which can make the microspheres dissolve, become porous, etc., to release the anti-scalant, optionally without releasing the magnetic nanoparticles. By comparison, in such an example, the Earth's magnetic field is static and of relatively low strength; as such, it may not have the same effect.

As an example, tubing can include one or more magnets disposed at various intervals. In such an example, the magnets can be oriented in opposing manners such that a particle flowing in the tubing experiences an alternating magnetic field effect with respect to time. As an example, where a downhole component can periodically release anti-scalant particles that may be encapsulated or otherwise configured for controlled release, the anti-scalant particles can be triggered to release anti-scalant when they flow by one or more of the magnet assemblies that create an alternating field effect. Further, in such an example, the anti-scalant particles may slow down and/or speed up in the presence of one or more magnetic fields. Accordingly, the residence time (e.g., via control of flow velocity) and release of anti-scalant (e.g., via heating, etc.) may be controlled along a length of tubing. In such an example, where magnets are not present, the anti-scalant particles may flow benignly according to their density and shape; whereas, in the presence of a magnetic field or magnetic fields generated by a magnet or magnets, the anti-scalant particles may behave differently, for example, as to velocity, movement, release of anti-scalant, etc. Further, as mentioned, the presence of magnets alone may provide some amount of anti-scaling effect.

As example, a magnetic field may be within a flow region, which may be tailored to be within one or more portions of the flow region with a particular field strength, field direction, field gradient, etc., to reduce scale deposition, for example, during production of fluid from a reservoir. As an example, a method can include selecting one or more multidimensional magnetic arrangements, one or more material selections, and one or more techniques of manufacturing to manufacture a component, an assembly, a system, etc. Manufactured equipment may include one or more of valves (e.g., safety, flow control, isolation, gas-lift, injection, etc.), miscellaneous orifices (e.g., ICD, perforated liners, screens, etc.), or zone isolation elements (e.g., packers, etc.) to actively reduce scaling during hydrocarbon production.

As an example, manufacturing can include one or more additive processes. For example, consider stereolithography (e.g., SL or SLA) as a laser-based technology that can cure layer-upon-layer of photopolymer resin (e.g., polymer that changes properties when exposed to light). Such an approach can build in a pool of resin where one or more laser beams are directed into the pool of resin to trace one or more cross-section patterns for curing. A product may be machined, used as a base for making an injection molding mold, thermoforming or other casting processes, etc.

As another example, consider fused deposition modeling (FDM), which is a thermoplastic-based (polymer that changes to a liquid upon the application of heat and solidifies to a solid when cooled) injection process where a thermoplastic can be injected through indexing nozzles onto a platform. For example, nozzles can trace a cross-section pattern for each particular layer with the thermoplastic material hardening prior to the application of the next layer. As with SLA, a product may be machined or used as a pattern.

Another example technology is multi-jet modeling (MJM), which is akin to an inkjet printer in that a head, capable of shuttling back and forth (e.g., in 2D, 3D, etc.) can include small jets to apply a layer of thermopolymer material (e.g., layer-by-layer).

Yet another example technology is 3DP (e.g., a type of 3D printing), which involves building a model in a container filled with powder material where an inkjet-like printer head shuttles to apply an amount of binder to form a layer. Upon application of the binder, a new layer of powder is swept over the prior layer with the application of more binder.

As another example, consider selective laser sintering (SLS), which utilizes a high-powered laser to fuse small particles of plastic, metal, ceramic or glass. During a build cycle, a platform on which the build is repositioned can be moved by a single layer thickness. For SLS, a support material is not necessarily required as the build may be supported by un-sintered material.

As an example, additive technology may be utilized to form a sheet that can be curved to fit inside a tubular or may build inside a tubular. For example, consider a laser, a moving head, etc., that can move in a lumen of a tubular to build a structure along a wall of the tubular.

As an example, an additive process can include depositing material that may be magnetic and/or capable of being magnetized (e.g., magnetic material), that may be degradable (e.g., as part of a release mechanism), that may be an anti-scalant, that may be a protective layer (e.g., to protect magnetic material), that may define a particular surface shape (e.g., roughness, etc.), etc.

As an example, a process can include subjecting magnetic material to a field to magnetize the magnetic material. In such an example, the field (or fields) may be applied to generate one or more magnets of particular strength, direction, gradient, etc.

As explained, various types of scale and scaling mechanisms exist. In hydrocarbon production, scaling can be caused by the inverse solubility of salts in water that have recrystallized from solution onto a surface (e.g., equipment surface). Scaling can occur as a result of changes in water composition (e.g., water mingling), pH, temperature, pressure, outgassing, etc., (e.g., one or more parameters that may influence salt solubility, etc.).

As mentioned, calcium carbonate tends to be a relatively common constituent of scales, particularly in high-temperature $CO_2$ wells. Other scales forming salts include magnesium carbonate, calcium sulfate, barium sulfate, strontium sulfate, iron carbonate, iron sulfide, among others. These scale forming salts can originate from rocks in contact with subterranean hydrocarbon and/or water. The sulfate scales tend to form as a result of reservoir water mingling and have been observed at sand screens, among other types of equipment.

Various magnetic field-related mechanisms can impact scale formation, which include, for example, hydration effects, and magnetohydrodynamic phenomena under continuous flow condition, both of which involve Lorentz forces (e.g., forces acting on a moving charged particle in a magnetic field).

Lorentz forces have been proposed to be responsible for different phenomena, including dissolution enhancement, crystallization nuclei formation, stabilization of coordinated water, and double layer distortion.

As to the hydration effect, it can involve magnetically induced changes in hydration of ions, gas/liquid interfaces, and/or hydrophobic solid surfaces, which also account for impacts observed under static or quiescent treatment conditions (e.g., without the flow of the treated fluid phase through a magnetic field).

A MF can accelerate crystallization of sparingly soluble diamagnetic salts of weak acids such as carbonates and phosphates. The MF-related mechanisms involve changing the orientation of the proton spin, thereby disturbing hydration effects by hindering the transfer of the proton to a water molecule. Stabilization of the hydration shell of scale forming ions favors dissolution because dehydration and precipitation can become more difficult to achieve. Correlation in dissolution rates with the ionic surface tension increment has been also reported as a MF-related mechanism. Hence, the hydration effect has been positively associated with surface tension of water that determines the interfacial interactions between water molecules and scale forming ions or solid surfaces. As an example, as magnetic field exposure time increases, the surface tension of water may decrease. Surface tension can be defined as the surface energy per unit area, and in the aqueous system, the surface energy of a solid-liquid state is more than that of a liquid-liquid state. The presence of colloidal particles can increase the surface energy at the water-colloid interface. Where multiple phases are present, MF-related surface tension effects may be utilized for one or more purposes, which can include scale mitigation. As to liquid and gas phases, alteration of surface tension using one or more magnetic fields can affect interactions between liquid and gas phases (e.g., consider gas bubbles in a liquid stream, etc.).

Figure 9:
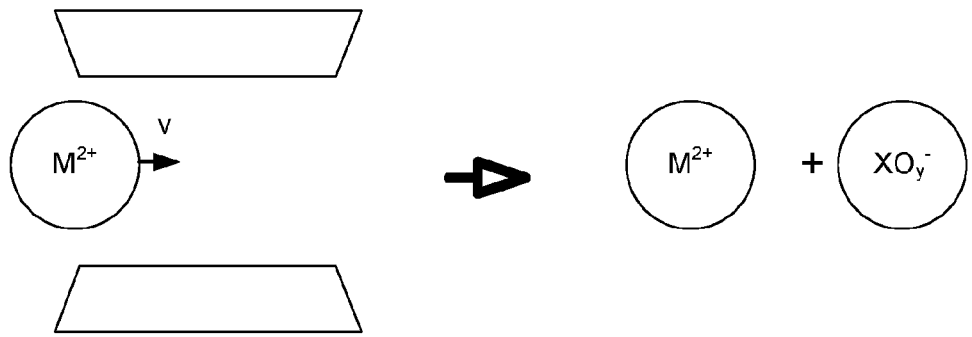
FIG. 9 illustrates examples of processes.
Figure 9:
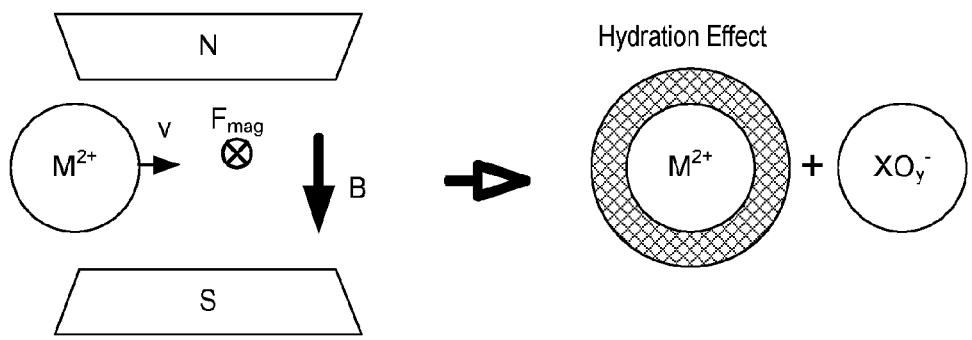

FIG. 9 shows example graphics 910 and 930 with and without the hydration effect. In the graphic 910, a metal ion (e.g., a cation) flows in tubing with a velocity v without alteration of hydration while, in the graphic 930, a metal ion flows with a velocity v in a direction orthogonal to a magnetic field B to experience a Lorentz force (e.g., $F_{mag}$) whereby the metal ion accumulates a hydration layer (e.g., a hydration shell, etc.). In such examples, where the hydration effect is present due to a magnetic field, the metal ion can be larger and more readily suspended in water; whereas, without such hydration (e.g., magnetic field and flow induced hydration), the metal ion is smaller and less suspended in water such that it may become influenced by gravity, etc., which may cause the metal ion to become closer to an anion with which it may crystal, amorphous structure, etc. (e.g., a component of scale, etc.).

As mentioned, magnetohydrodynamic phenomena can help reduce scaling. Magnetohydrodynamic phenomena can exist when a fluid flows in a MF, such as in dynamic treatment conditions. Prospective magnetohydrodynamic mechanisms may consider various observed effects of a dynamic MF treatment because of the action of the Lorentz force, $F_L$. The magnitude of this force can be defined by the following equation:

$$|F_L|q|v \times B|=qvB \sin \theta$$

where q is the quantity of charge, v is its velocity, B is the magnetic induction, and $\theta$ is the angle between v and B vectors.

The Lorentz force can stimulate charged species in an electrolyte solution/dispersion traversing a MF, including the surface charge, ions in the electrical double layer near charged surfaces, and free ions in the solution. The magnetohydrodynamic mechanisms can be used to describe various MF effects, such as the effect of fluid velocity, magnetic induction on the quantity and crystal structure of scale, and a main scale component, etc.

Figure 10:
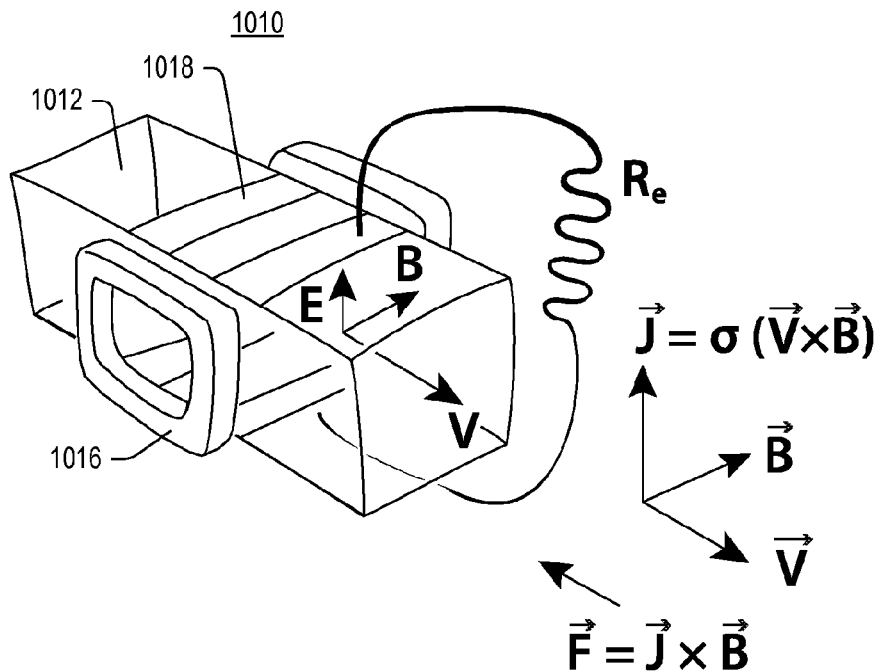
FIG. 10 illustrates examples of processes.
Figure 10:
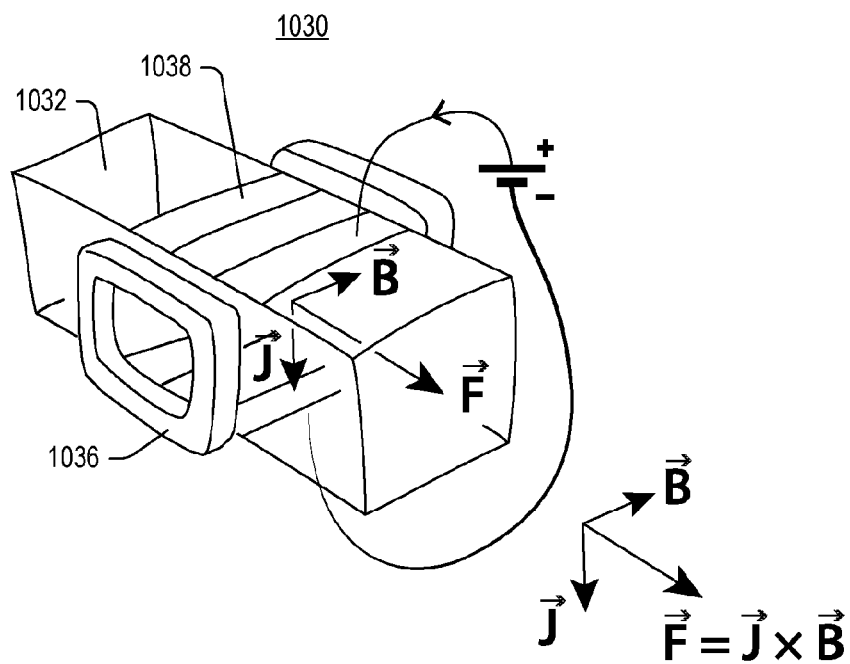

FIG. 10 shows example graphics 1010 and 1030 that illustrate magnetohydrodynamic phenomena. A magnetohydrodynamic converter (MHD converter) is an electromagnetic machine with no moving parts involving magnetohydrodynamics, kinetics of electrically conductive fluids (e.g., liquid or ionized gas) in the presence of a magnetic field. Such converters act on the fluid using the Lorentz force to operate as either as an electric generator called an MHD generator, extracting energy from a fluid in motion as in the graphic 1010; or as an electric motor called an MHD accelerator or magnetohydrodynamic drive, putting a fluid in motion by injecting energy as in the graphic 1030. MHD converters may be reversible. Specifically, the graphics 1010 and 1030 show crossed field magnetohydrodynamic converters (e.g., linear Faraday type with segmented electrodes) where the graphic 1010 shows an MHVUD generator mode and the graphic 1030 shows an MHD accelerator mode.

FIG. 10 shows some example equations where B is the magnetic flux intensity, J is the current density, V is the velocity vector, F is the electromagnetic force, $\sigma$ is the electrical conductivity, and $R_e$ is a circuit resistance. As shown, in the graphic 1010, a MHVUD assembly can include a conduit 1012 (e.g., a tubing, etc.), solenoids 1016 and segmented electrodes 1018 and, as shown in the graphic 1030, a MHD assembly can include a conduit 1032 (e.g., a tubing, etc.), solenoids 1036 and segmented electrodes 1038.

The graphics 1010 and 1030 in FIG. 10 intend to illustrate magnetohydrodynamic (MHD) effects; noting that marine MHD propulsion tends to be impractical due to its low efficiency as limited by the relatively low electrical conductivity of seawater for purposes of propulsion. Further, in marine MHD, increasing current density tends to be limited by Joule heating and water electrolysis in the vicinity of electrodes. In various instances, in marine MHD, increasing magnetic field strength may be limited by size and mass of electromagnets and available electrical power for magnetic field generation by electromagnets.

As explained, MHD effects can be of a magnitude that can alter scaling. As mentioned, the Lorentz force can be of a magnitude that can alter scaling and the hydration effect can be of a magnitude that can alter scaling. As an example, one or more downhole components can include features to alter scaling, which can be anti-scaling features that operate via one or more mechanisms.

Figure 11:
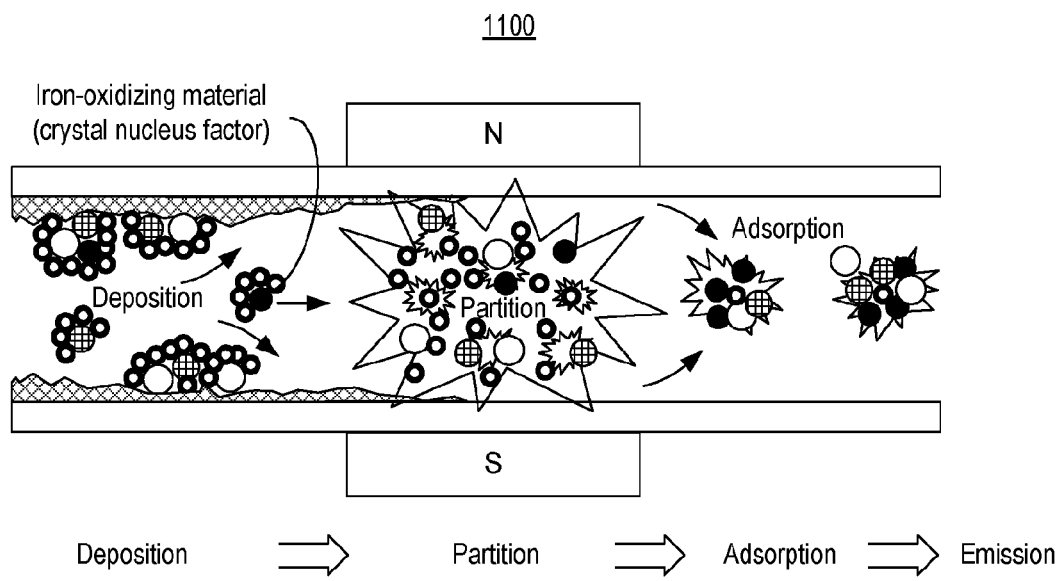
FIG. 11 illustrates examples of processes.

FIG. 11 shows an example graphic 1100 that illustrates an example of magnetic water treatment that operates as water passes through a magnetic water softener where a Lorentz force is exerted on each ion which is in the opposite direction of each other. In such an example, the redirection of the particles aims to increase the frequency of collisions between ions of opposite sides, combining to form a mineral precipitate or insoluble compound.

As to magnetic field generation, permanent magnets and/or electromagnets may be utilized where the latter include circuitry for electrification, which, depending on the circumstances may or may not be available and/or practical in various downhole scenarios. Where one or more electromagnets are utilized, a magnetic field or magnetic fields may be varied (e.g., alternating, cyclic, adjustable magnetic fields of suitable frequency, etc.). As mentioned, where fluid is flowing, an arrangement of magnets may provide for a time-varying field effect.

When applied to water treatment (e.g., water softening), magnetic treatment of water may provide for one or more of reduction in the amount of scale formed (e.g. carbonates); production of less tenacious scale due to a change in the crystal morphology; removal of existing scale; and retention of anti-scaling properties for a period of time following treatment.

Figure 12:
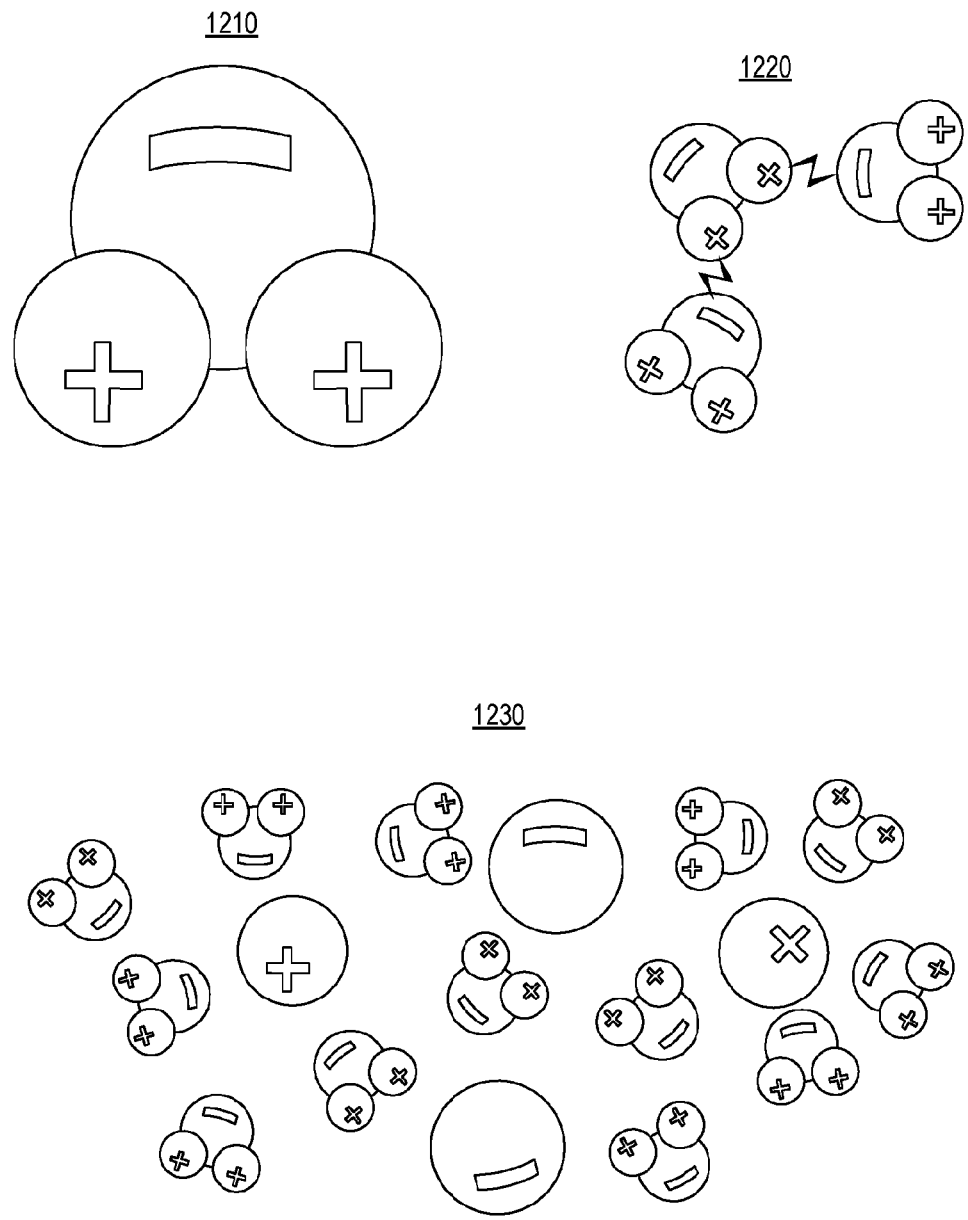
FIG. 12 illustrates examples of water and interactions.

FIG. 12 shows example graphics of a water molecule 1210, hydrogen-bonding of water molecules 1220 and salt dissolved in water 1230 (see, e.g., larger positive spheres and even larger negative spheres). Magnetic treatment of water can involve water polarity where a water molecule may be viewed as possessing a dipole. Specifically, water is a bent molecule with two light hydrogen atoms attached to a 16-fold heavier oxygen atom. A water molecule is electrically neutral but polar, with the center of positive and negative charges located in different places. Each hydrogen atom has a nucleus of a single positively charged proton surrounded by a cloud of a single negatively charged electron while the oxygen atom has a nucleus of eight positively charged protons and eight uncharged neutrons surrounded by a cloud of eight negatively charged electrons. On forming the molecule, the ten electrons pair up into five orbitals, one pair closely associated with the oxygen atom, two pairs associated with the oxygen atom as outer electrons and two pairs forming each of the two identical O—H covalent bonds. The eight positive charges in the oxygen nucleus attract the electrons strongly relative to the single positive charges on each of the hydrogen atoms, which results in the hydrogen atoms being partially denuded of electrons and hence partially positively charged and the oxygen atom partially negatively charged. The presence of a dipole moment in water molecules causes its polar nature. The opposite charges on the oxygen and hydrogen atoms cause different water molecules to attract each other. This attraction is particularly strong when the O—H bond from one water molecule points directly at a nearby oxygen atom in another water molecule, that is when the three atoms O—H O are in a straight line, which is referred to as hydrogen-bonding as the hydrogen atoms appear to hold on to both O atoms. This attraction between neighboring water molecules, together with the high-density of molecules due to their small size, produces a relatively large cohesive effect within liquid water that is responsible for water's liquid nature at ambient temperatures.

In FIG. 12, the graphic 1230 depicts how a charge, such as on an ion (Na or Cl, for example) can interact with a water molecule. At the molecular level, salt dissolves in water as ions; e.g., the chloride ion is negatively charged, and the sodium ion is positively charged. Likewise, a water molecule is ionic in nature, but the bond is covalent, with two hydrogen atoms both situating themselves with their positive charge on one side of the oxygen atom, which has a negative charge. When salt is mixed with water, the salt dissolves because the covalent bonds of water are stronger than the ionic bonds in the salt molecules.

The positively charged side of each of the water molecules is attracted to the negatively charged chloride ions and the negatively charged side of each of the water molecules is attracted to the positively charged sodium ions. Water molecules effectively pull sodium and chloride ions apart, breaking the ionic bond. After the salt compounds are pulled apart, the sodium and chloride atoms are surrounded by water molecules, as shown in the water 1230. Once this happens, the salt is dissolved, resulting in a homogeneous solution.

Figure 13:
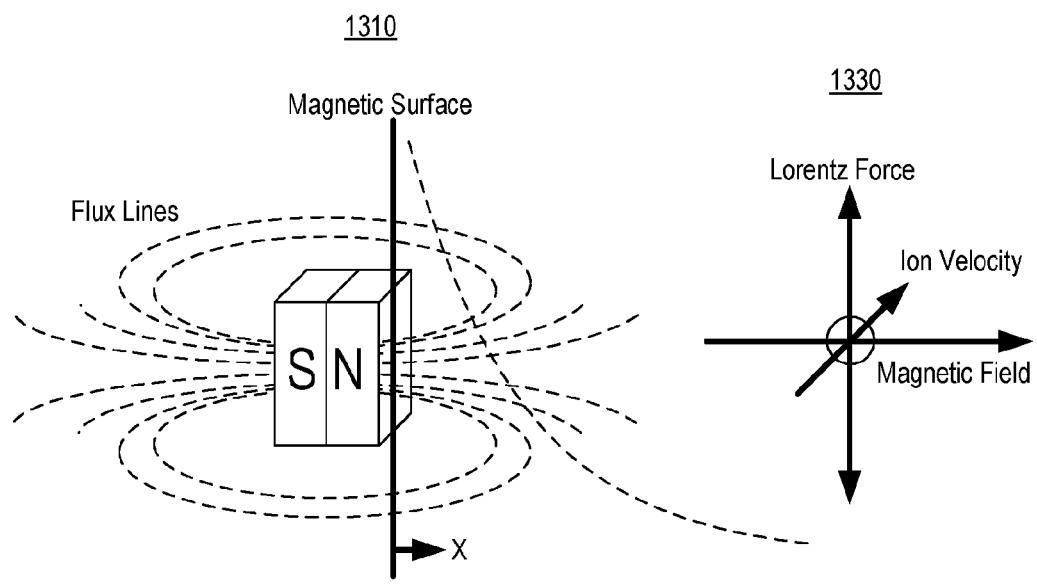
FIG. 13 illustrates examples of magnetic effects.

FIG. 13 shows example graphics 1310 and 1330 as to a magnetic field and the Lorentz force, respectively. The graphic 1310 shows a schematic of magnetism and the effect of a constant magnetic field on an arbitrary charged particle, such as an ion. The magnetic field caused by a permanent magnet with North and South poles may decrease exponentially from a surface of the permanent magnet. In general, the stronger the magnet, the stronger the magnetic field; noting that magnetic fields may be tailored to be of a desired particular shape, polarity, gradient, homogeneity, etc. A charge particle entering and moving into a magnetic field experiences a force that is normal to both the magnetic field and its instantaneous trajectory where the force is referred to as the Lorentz force. In the graphic 1330, orientations of vectors are shown, including charge particle velocity, magnetic field, and Lorentz force. The latter, if energetic, oscillatory, and creating a high level of collision and charge distribution can influence scale formation.

Figure 14:
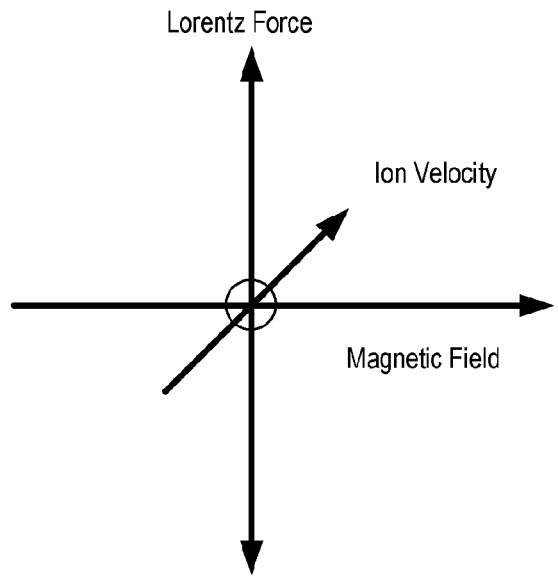
FIG. 14 illustrates examples of magnetic effects.
Figure 14:
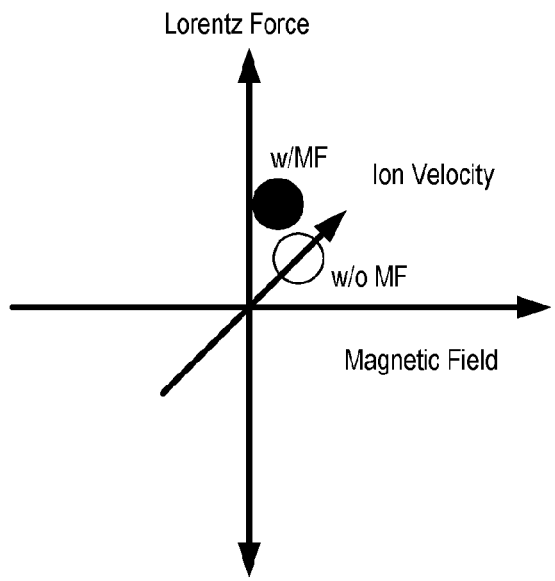

FIG. 14 shows example graphics 1410 and 1430 of a charged particle under a constant magnetic field. As indicated, the particle trajectory can be altered, for example, in a manner that can depend upon the strength of the magnetic field (e.g., to alter the trajectory due to the Lorentz force).

Figure 15:
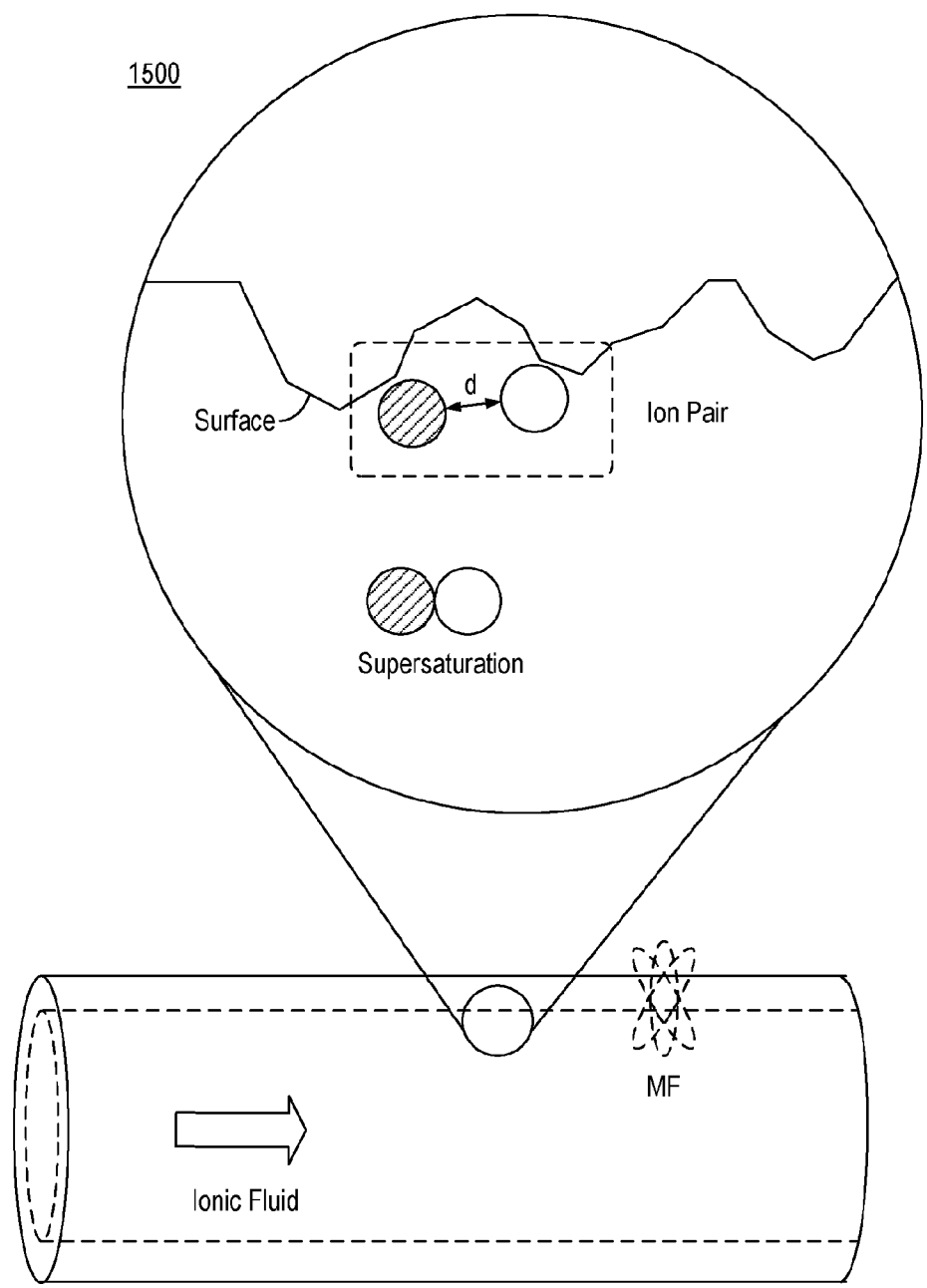
FIG. 15 illustrates an example of an anti-scaling process.

FIG. 15 shows an example graphic 1500 of heterogeneous nucleation on a surface of tubing as interrupted by a magnetic field. As indicated, under influence of the magnetic field, a separated ion pair is at the surface (e.g., charge separation), which can reduce deposition of a salt at the surface (e.g., reduced scaling by that salt). In the example graphic 1500, a distance d is illustrated as a distance that is a separation distance between the ion pair. In such an example, the distance d is greater than a distance between the ion pair when the ions of the ion pair are not separated. As an example, consider an ion pair of sodium and chlorine ions where electrons may transfer from sodium atoms to adjacent chlorine atoms, since the valence electrons in sodium are loosely bound and chlorine has a large electron affinity. The positively charged sodium ions and negatively charged chlorine (chloride) ions can organize into an extended regular array of atoms (e.g., a crystalline form). As an example, depending on species in a solution and/or at a surface, scale may be in one or more forms (e.g., crystalline, amorphous, etc.).

One or more magnetic fields may be utilized for surface and/or downhole scale control of one or more components. As an example, equipment may include one or more magnets where the equipment can be positioned downhole proximate to flowing fluid. For example, equipment can include one or more lumens or may be positioned adjacent to one or more lumens. As mentioned, a gas lift valve may include one or more magnets and/or a pocket (e.g., a mandrel pocket) may include one or more magnets.

As explained, a magnetic field proximate to aqueous flowing fluid with salt can provide a charge-interaction between ions of the salt in the aqueous flowing fluid that can mitigate scale formation on a surface (e.g., a tubing surface, etc.). In various instances, a magnetic field may aim to influence a surface of tubing where scale is to be mitigated and/or may aim to influence a bulk region that is defined by the surface. For example, a magnetic field may impact a surface boundary region of a surface that is within a relatively small distance from the surface and/or a magnetic field may impact a bulk region that is further from the surface boundary region. Where the surface is an inner surface of a tubing, the bulk region can be radially inward from the inner surface; whereas, where the surface is an outer surface of a tubing, the bulk region can be radially outward from the outer surface (e.g., consider an annular bulk region, etc.). As mentioned, a magnetic field may be implemented in combination with one or more other anti-scaling technologies, which may include coatings, anti-scalants, heaters, etc.

Referring again to the system 100 of FIG. 1, one or more components may be positioned downhole (e.g., one or more downhole components) and be part of production or injection tubing, which may have a length of approximately 1 cm to approximately 15 m. In such an example, a cross-sectional dimension (e.g., diameter, major axis, channel width, etc.) may be of the order of 0.5 cm to approximately 50 cm. As an example, equipment may be characterized by an aspect ratio defined by length and cross-sectional dimension (e.g., consider a length per width (diameter) ratio between 1 and 120).

As an example, a component may include an internal channel communicating with completion tubing (e.g., passing the same fluid, a different fluid, etc.). For example, consider the system 300 of FIG. 3 where the gas-lift valve 360 sits in a channel that is a pocket 350 where gas (e.g., a fluid) can enter a main flow channel of the mandrel 340. As mentioned, such an operation can be a gas-lift operation where one or more changes can occur responsive to introduction of gas. As illustrated, the pocket 350 and the gas-lift valve 360 are exposed to fluid flowing in the main channel of the mandrel 340. One or more magnets can be included in the system 300 to mitigate scale formation on one or more portions of the mandrel 340 and/or the gas-lift valve 360. In such an example, the one or more magnets may be included with the gas-lift valve 360 and/or may be included with the mandrel 340 and/or may be included with the casing 335 (e.g., a type of tubing). One or more magnets may emanate one or more magnetic fields into one or more regions of the system 300. As explained, a magnetic field may aim to be localized to a surface region and/or may aim to be extended into a bulk region.

Referring to the plots 610, 630 and 650 of FIG. 6, as shown in the plot 630, mineral solubility can depend on pressure. Further, mineral solubility may depend on pH and/or another parameter that may change when gas is introduced into a flow stream (e.g., as in gas lift). As an example, consider interfacial area, which may be increased upon introduction of gas into a liquid flow stream (e.g., or introduction of more gas into a mixed phase flow stream of gas and liquid). As mentioned, a magnetic field can influence interfacial tension. As such, the size, shape, number, etc., of bubbles formed by introduction of gas into a fluid stream can depend on one or more magnetic field characteristics. In gas lift, a maximum stable bubble diameter can depend on turbulence conditions and surface-tension properties; noting that time for coalescence of bubbles can be related to the surface-tension properties of the gas-liquid interface. Gas lift characteristics can depend on generation of local repulsion forces due to interfacial polarization and/or local gradients of ions concentration resulting in surface-tension gradients (the Marangoni effect).

The Marangoni effect involves mass transfer along an interface between two fluids due to a gradient of the surface tension; noting that in the case of temperature dependence, this phenomenon may be referred to as thermo-capillary convection. As explained, a magnetic field can alter surface tension in a manner that can depend on strength of the magnetic field and/or exposure time to the magnetic field (e.g., as magnetic field exposure time increases, the surface tension of water may decrease). As such, a magnetic field can generate a surface tension gradient, which may result in mass transfer (e.g., the Marangoni effect). Where one or more surfactants are present, a magnetic field may alter a surfactant effect, which, in turn, may alter how one or more phases of a multiphase stream interact. For example, consider a method that includes altering surfactant diffusion along an interface in a manner that depends on a magnetic field strength, a magnetic field gradient, magnetic field orientations, etc. As an example, a surfactant may be a magnetizable surfactant.

As an example, a method can include utilizing one or more magnetic surfactants. For example, consider one or more magnetic ionic liquid surfactants (MILS). As an example, 1-butyl-3-methyl-imidazolium tetrachloroferrate can be utilized as a magnetic surfactant as may be one or more other cationic surfactants with ferric chloride (e.g., 1-methyl-trimethylimidazolium tetrachloroferrate, etc.). As to a MILS, at a gas-water interface, in the absence of an applied magnetic field, magnetoresponsive surfactants may be more effective than a magnetically inert analogue, showing greater surface tension ($\gamma$) reduction of water for the same concentration. On placing a magnet (e.g., 0.4 T) close to an aqueous solution, a magneto responsive surfactant may reduce surface tension ($\gamma$) even further. As an example, a surfactant may be an anti-scalant. For example, trimeric cationic pyridinium surfactants exhibit anti-scaling behavior in formation fluids. As an example, one or more of such surfactants may be made to be a magnetic surfactant (e.g., through use of ferric chloride, etc.). As an example, a magnetic field or magnetic fields may be utilized to control behavior of a magnetic surfactant for purposes of anti-scaling control (e.g., to enhance, to diminish, etc.). In such an example, a magnetic field itself may provide for anti-scaling benefits while additionally providing for control of one or more magnetic surfactants.

As explained, various types of equipment can be affected by scale. For example, if a mandrel and/or a gas lift valve scales, operation and/or servicing of the gas lift valve may be impaired. Where operation is impaired, less gas may be emitted, which may reduce production rate and increase residence time of fluid in proximity to the gas lift valve, which may, in turn, result in increased scale formation. As explained, magnetic field scale mitigation can help to address detrimental scaling of equipment, which may extend operational lifetime, preserve an ability to service (e.g., alter, adjust, replace, etc.), and maintain or increase production (e.g., or injection).

As explained, a system such as the system 100 of FIG. 1, the system 200 of FIG. 2, the system 300 of FIG. 3, etc., can include at least one fluid flow passage supplemented by one or more active magnetic fields produced by permanent magnets along a path or paths of fluid therein.

Figure 16:
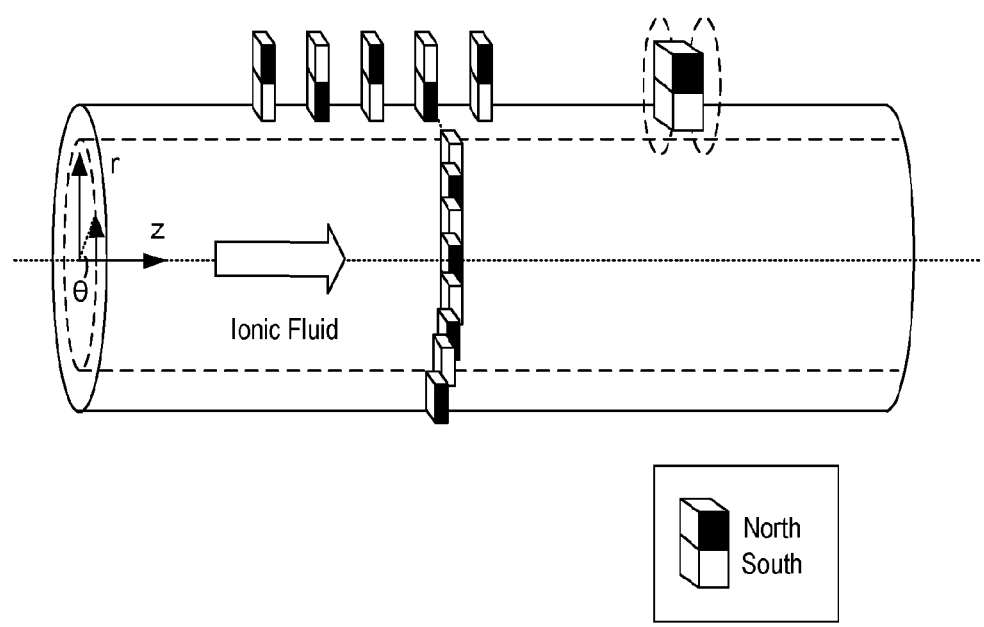
FIG. 16 illustrates an example of a system.

FIG. 16 shows an example of a system 1600 with various examples of magnets arranged with respect to a general direction of fluid flow in a tubing. In FIG. 16, the magnets are represented as having poles, including a north pole (solid black) and a south pole (solid white). In a cylindrical coordinate system with axial, z, radial, r, and azimuthal, $\theta$, coordinates, magnets may be arranged axially, radially and/or azimuthally. As shown, pole orientations can be arranged such as to create alternating magnetic fields along an axis (e.g., and/or one of the other coordinates).

As mentioned, where fluid flows in static magnetic fields with different orientations, the fluid can experience an effect akin to that of a time-varying magnetic field. In such an example, the frequency of variation depends on factors such as spacing, orientation arrangement, and flow velocity. For example, a faster flowing fluid can experience a higher frequency of variation. Where fluid flows with a parabolic profile (e.g., laminar flow), the fluid will experience different frequencies of variation along the flow profile and, where fluid flows in a plug-flow manner, the bulk of the fluid will experience approximately the same frequency. As such, one or more magnetic fields may be arranged in a manner that depends on one or more aspects of flow (e.g., velocity, laminar, turbulent, etc.).

While the example system 1600 of FIG. 16 shows axially aligned magnets with alternating orientations (e.g., NSNSNS), a system can include one or more portions with axially aligned magnets with consistent orientations (e.g., the same polarity along the flow length, such as NNNNN or SSSSS inward, outward, axially, etc.).

As an example, one or more permanent magnets may be formed from material that can be magnetized (e.g., ferromagnetic material, etc.). For example, consider shaping material into a desired shape for a component and then magnetizing the shaped material. As an example, a direct, an indirect or a direct and indirect approach may be utilized to form a permanent magnet.

As to a direct approach, as an example, current can be passed directly through material. Such an approach may involve clamping the material between two electrical contacts where current is passed through the material and a circular magnetic field is established in and around the material. When the magnetizing current is stopped, a residual magnetic field can remain within the material where the strength of the induced magnetic field can be proportional to the amount of current passed through the material.

As to an indirect approach, a strong external magnetic field may be utilized to establish a magnetic field within the material. Such an approach may utilize one or more of a permanent magnet, an electromagnet, a coil, a solenoid, etc. For example, consider a material that is placed longitudinally in a concentrated magnetic field that fills a center of a coil or solenoid.

As an example, a component can include a substrate that can be utilized for supporting one or more magnets. In such an example, the substrate may be a platform upon which one or more layers are constructed. As mentioned, an additive process can be utilized to form one or more layers. As an example, an additive process may be performed on a sheet and/or in situ. For example, where a sheet is formed, it may be shaped to be inserted into tubing (interior) or onto tubing (e.g., exterior). As to an in-situ approach, one or more layers may be formed directly onto an inner surface and/or an outer surface of a component.

As an example, an additive process can include depositing support material and depositing magnetic material. For example, consider forming a lattice using the support material where various interstices of the lattice may be filled with magnetic material, which may be magnetized prior to, during or after deposition. As an example, an additive process can include depositing one or more protective layers that may aim to protect a lattice and/or magnetic material. As an example, a sheath (e.g., a sleeve, etc.) may be utilized to protect materials deposited via an additive process.

As to materials that may protect magnetic materials yet allow passage of a magnetic field, consider one or more of glass, concrete, polytetrafluoroethylene, copper, etc. Materials can be classified by how they will interact with magnetic fields, for example, diamagnetic materials can create an induced magnetic field that opposes an applied magnetic field; paramagnetic materials can create an induced magnetic field that can attract toward a source of an applied magnetic field; and ferromagnetic materials can be or become permanent magnets.

The strength of an applied magnetic field as it propagates through a material can depend on strength of the applied magnetic field, the specific type of intervening material, and the thickness of the material. Superconductors, such as lead, tin, and mercury, tend to be a particular class of materials that will not allow a magnetic field to pass through.

As an example, a sheath can include a particular design of one or more materials where the materials can differ in their ability to allow for passage of a magnetic field. In such an example, a layered component can include magnetic material that is magnetized where the sheath determines how and where magnetic fields penetrate the sheath. As an example, a layered component can include magnetic material that provides a particularly defined magnetic field or magnetic fields where a sheath may be made of a material that allows for passage of such a magnetic field or magnetic fields. As an example, a combination of defined magnetic fields and sheath determined magnetic fields may be utilized. As an example, an orientation (e.g., azimuthally, axially, etc.) of a sheath with respect to a layered component may provide for tailoring of a desired arrangement of magnetic fields. As an example, a sheath may be an "on" and "off" device where in one orientation it blocks magnetic fields and, in another orientation, it passes magnetic fields. As an example, a sheath may be orientable on-site, which may optionally be downhole. For example, consider orienting a sheath to transition a component to an "on" state just prior to deployment and/or using a tool and/or using flow to cause a transition downhole. For example, consider a fin that may be degradable that cause rotation of a sheath downhole responsive to flow to transition a component from an "off" state to an "on" state. In an "off" state, a component may be readily handled with risk of accumulation of particles, etc., to its magnetic fields (e.g., along an interior or exterior). And, when the component is ready to be utilized for its anti-scaling abilities, it may be transitioned to its "on" state.

As an example, a component can include a structural member (e.g., a structural layer, etc.) that provides support for permanent magnets and that provides mechanical loading (e.g., pressure) ability sufficient for use in oilfield operation(s) (e.g., consider 10 ksi, 20 ksi, etc. pressure differentials)

As an example, a component can include an array of magnets, positioned to create electromagnetic forces at a surface of the component that may be exposed to fluid that can flow. As an example, a component can include a protective sheath that aims to seal off magnets from well fluid.

Figure 17:
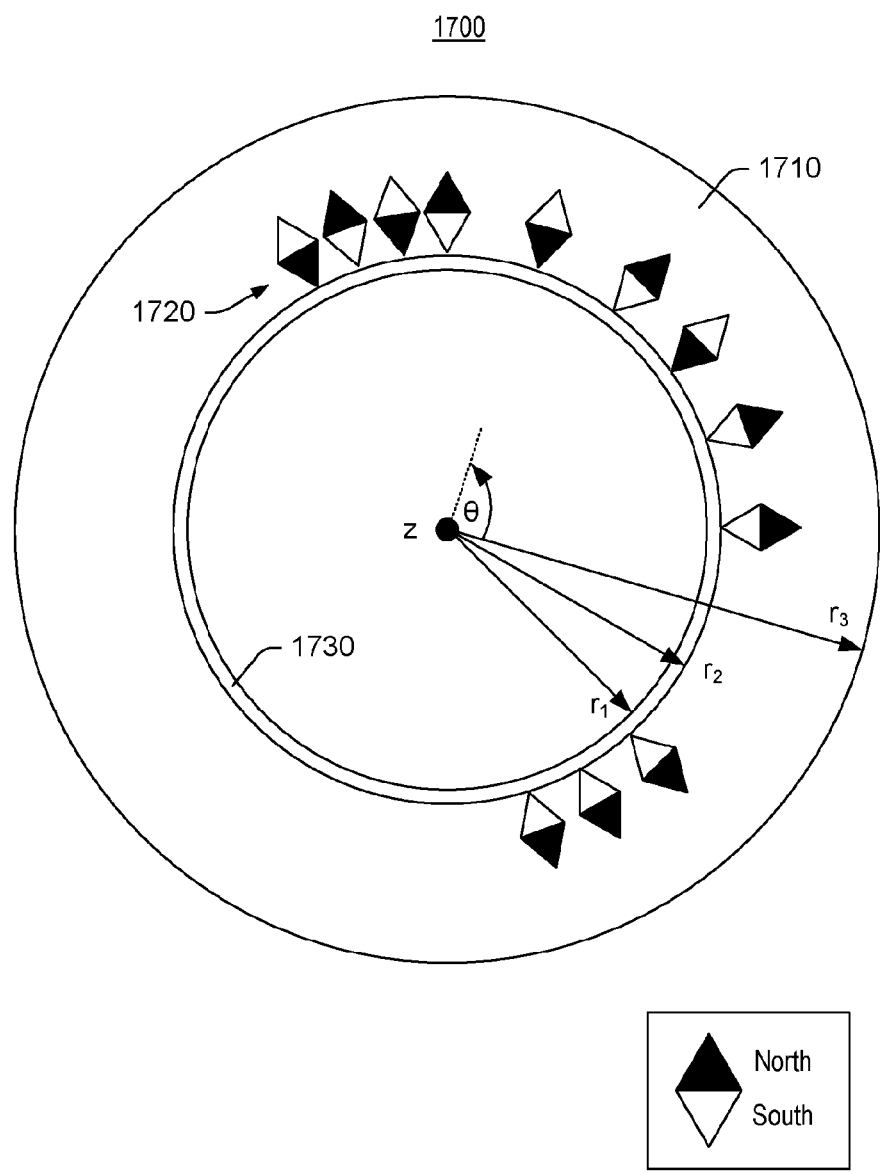
FIG. 17 illustrates an example of a component.

FIG. 17 shows an example of a component 1700 that includes a substrate 1710 that supports magnets 1720, which may be integrated into the substrate, in a separate layer or layers, etc., and a sheath 1730 that can help to protect the magnets 1720. As mentioned, a sheath can be formed of one or more materials and may be orientable such that it interacts with magnets in a manner to provide for passage, shaping, and/or non-passage of one or more magnetic fields. In the example of FIG. 17, the component 1700 can be a tubing component that includes a lumen defined at least in part by the sheath 1730 and that can withstand a suitable level of pressure for performing one or more field operations (e.g., including being disposed more than 100 m below the surface of the Earth).

In the example of FIG. 17, a cylindrical coordinate system is illustrated with an axial coordinate, z, a radial coordinate, r, and an azimuthal coordinate θ. As shown, layers may be defined by radial coordinate values such as $r_1$, $r_2$ and $r_3$, which may be utilized to define thicknesses, ratios of flow cross-sectional area to solid body area, composite matrix area, etc.

As an example, a component such as a flow control valve piston, an orifice, a mandrel, a valve, etc., may include one or more features of the component 1700 of FIG. 17 for reducing scale deposition. In the example of FIG. 17, the arrangement of the magnets 1720 aims to illustrate that they may be arranged as desired for one or more purposes that include anti-scaling as one of the purposes.

Figure 18:
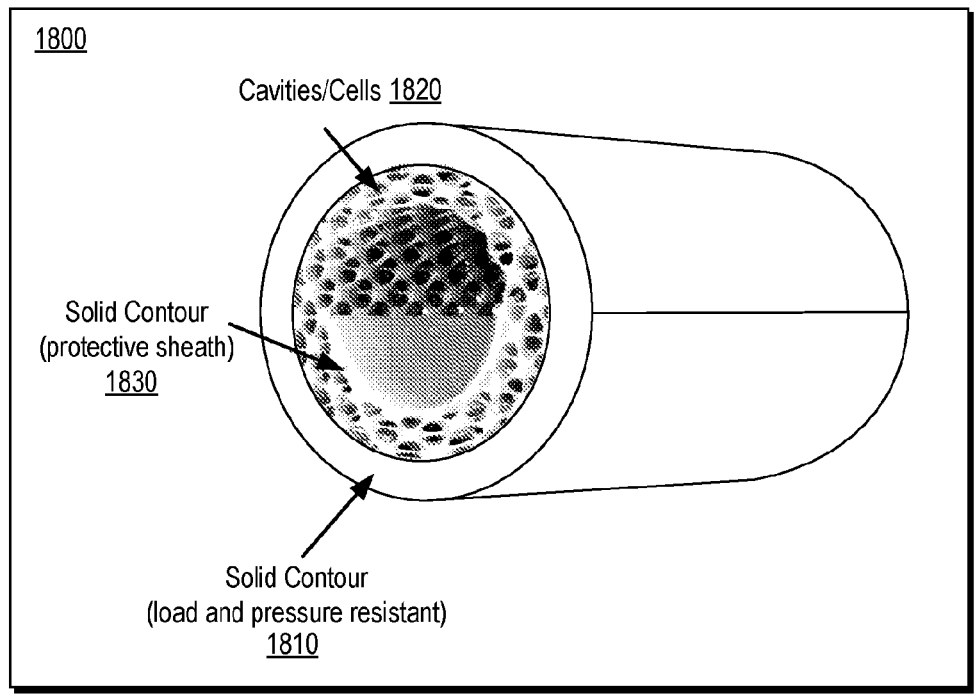
FIG. 18 illustrates an example of a component and an example of a process for making a component.
Figure 18:
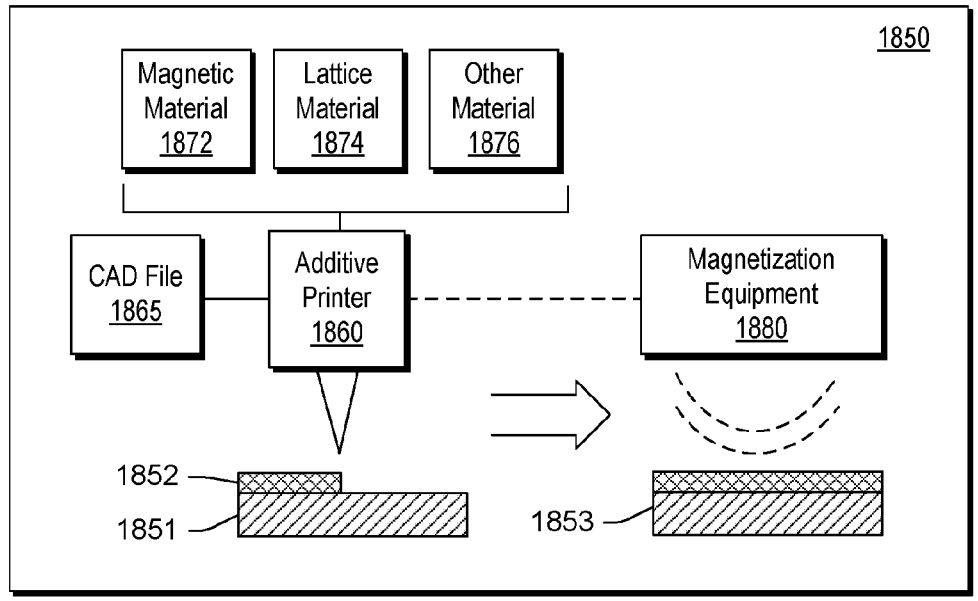

FIG. 18 shows an example of a component 1800 that includes a solid contoured support 1810 for load and pressure capabilities, a lattice 1820 of cavities, cells, etc., which may be occupied, at least in part, with magnetic material, and a sheath 1830 that can be a contoured sheath that may be permeable to material, impermeable to material, and permeable and/or impermeable to a magnetic field. In the example of FIG. 18, the lattice 1820 can include cavities, which may be of a particular size or sizes, shape or shapes, etc., and suitably filled, at least in part, with a magnetic material or magnetic materials (e.g., using additive manufacturing and/or another process or processes). As an example, a honeycomb type of structure may be formed where a selective approach can be utilized to determine which cells to fill and/or which orientation of magnetic material is to be created. As mentioned, magnetic material may be deposited prior to magnetization followed by magnetization, which may determine orientation of poles.

In the example of FIG. 18, the component 1800 can be a downhole component where the solid contoured support 1810 can be a support body that includes a surface that defines at least a portion of a fluid passage. In such an example, the lattice 1820 can be part of a composite matrix for scale mitigation supported by the surface of the support body where the composite matrix includes a lattice material that defines a lattice and magnetic material disposed in interstices of the lattice. As explained, the lattice 1820 may be covered by the sheath 1830, which may be a cover layer disposed on a composite matrix.

As explained, a composite matrix that includes magnetic material may be utilized as a feature for at least scale mitigation. As explained, one or more magnetized magnetic materials may facilitate positioning of downhole component and/or another downhole component. As an example, one or more magnetic fields may operate as fiducials for positioning, magnetic force (attractive and/or repulsive) positioning guides, etc. Where a downhole component is to be positioned at a substantial depth (e.g., more than 10 meters, more than 100 meters, more than 1000 meters, etc.), orientations and relative positions between downhole components may be difficult to ascertain (e.g., a relatively blind operation, etc.). Where a downhole component can generate one or more magnetic fields for scaling mitigation, one or more of those magnetic fields may facilitate positioning in a downhole environment.

FIG. 18 also shows an example of a process 1850 for making one or more components. As shown, a support body 1851 can be utilized as a support for one or more layers 1852 that can be manufactured using an additive printer 1860. The additive printer 1860 may be instructed according to a computer-aided design (CAD) file 1865, which may be an STL file, include STL types of instructions, etc. An STL file can include a triangulated representation of a multidimensional model, which may be a CAD model. As an example, the CAD file 1865 can include instructions that specify one or more types of materials to be deposited using the additive printer 1860, for example, in a multidimensional space. As shown, materials can include, for example, magnetic material 1872, lattice material 1874 and one or more other materials. In the example of FIG. 18, the process 1850 can utilize magnetization equipment 1880 for magnetizing at least a portion of the magnetic material 1872. In the example of FIG. 18, the magnetization equipment 1880 is illustrated as magnetizing a printed product 1853. As an example, the additive printer 1860 may provide for depositing magnetic material that is already magnetized and/or that is magnetized by one or more features of the additive printer 1860 (e.g., a coil, coils, a permanent magnet, etc.). In such an example, the ability to magnetize magnetic material at time of printing may be controllable, for example, specifications may be provided in a control file such as, for example, the CAD file 1865.

As an example, an additive printer with a mixing extruder can be utilized to mix permanent magnetic filaments with polymeric filaments. The magnetic filaments may be compounded, extruded, and characterized for a desired printing process. As an example, a process that includes additive printing may be utilized to manufacture magnets within a component where one or more of the magnets produce a predefined stray field in a given region or regions.

NdFeB magnets can include sintered and polymer-bonded magnets. Sintered magnets tend to have a higher maximum energy product $(BH)_{max}$ while polymer-bonded magnets may facilitate manufacturing of complex shapes and magnetization structures, generally, with a lower $(BH)_{max}$. Polymer-bonded magnets can be characterized as composites with permanent-magnet powder embedded in a polymer binder matrix. In such an example, hard magnetic particles, ferrite (e.g., Sr, Ba), and rare-earth materials (e.g., NdFeB) with a volume filler content (e.g., consider between approximately 40 vol. % to approximately 65 vol. %) may be utilized. Such compounds may be further processed with injection molding, extrusion, etc. NdFeB (NIB) particles for a compound may be produced by a melt spinning process. To achieve better rheological behavior, spherical particles may be utilized, which may be produced, for example, by an inert gas atomization process. As an example, magnetically isotropic powder may be utilized. As an example, a relatively high filler content may be utilized to increase viscosity of a melted compound. In various examples, a polymeric material such as polyamide material may be utilized (e.g., PA6, PA11, PA12 (or NYLON 12), etc.).

As mentioned, a method can provide for manufacture of polymer-bonded permanent magnets with a variable magnetic compound fraction, for example, along a printing direction. Such a fraction can be defined using a parameter "m", which is the fraction of the magnetic compound material from an entire volume that is emitted by a print head (e.g., print heads, print head nozzle, print head nozzles, etc.). As an example, a filler fraction of magnetic material can be proportional to the remanence Br. As an example, a process can include shaping a magnetic field without changing topology of an object. As an example, a method can include determining an optimal magnetization density distribution for a given target field.

As an example, an additive printer can utilize one or more techniques. For example, consider utilization of the fusing deposition modeling (FDM) principle. In such an example, a system can create an object layer-by-layer using a meltable thermoplastic. As an example, printing speed may range from approximately 10 mm/s to 80 mm/s or more, where traveling speed can be greater than printing speed. As an example, an additive printer can include a nozzle that receives material from a single feed extruder or a multi-feed extruder. In a multi-feed scenario, multiple materials may be mixed or, for example, one or more materials may be selected (e.g., one or more defined regions of an object can be printed with one or more of different materials). For example, consider a control file that instructs an additive printer to select one or more materials and change such a selection on-the-fly.

As an example, a process can include making multiple deposition runs. For example, consider depositing lattice material, which may be a mixture of materials, processing the lattice material to form interstices, and then depositing material in at least a portion of the interstices. In such an example, where a mixture of materials is used, one material may be dissolvable, meltable, or otherwise removable such that a lattice with interstices is formed. As an example, a process can include using material that can be processed to change state. For example, consider exposure to heat, pressure, UV or other radiation, to cause a change in state (e.g., polymerization, hardening, etc.). In such an example, where a removable material is utilized in combination with a state change material, removing the removable material may be facilitated after the state change material has changed state (e.g., become more permanent, durable, etc.).

As mentioned, an additive printer may include one or more types of equipment (e.g., coil, coils, permanent magnet, permanent magnets, UV emitter, laser, etc.). As an example, where detailed magnetization information is desirable, a printer may include a magnetic flux density measurement system. For example, consider using such a system to quality control an object where the object includes magnetized magnetic material.

As an example, magnetic material filament may be a polymer-bonded magnetic compound with polymer(s) and magnetically isotropic powder (MIP) (e.g., NdPrFeCo-TiZrB, etc.). As to a mixture ratio of polymer(s) to magnetically isotropic powder, consider, as an example, a ratio of 85 wt. % MIP and 15 wt. % polymer. As an example, a filament may be of the order of a millimeter or more in diameter and provided on a spool.

As to magnetization, an object with a variable magnetic compound fraction may be magnetized inside an electromagnet, a permanent magnet, etc. For example, consider a water-cooled electromagnet powered by a low-voltage power supply with maximum output current of 100 A or more and an operating voltage of approximately 200 V. In such an example, a maximum magnetic flux density inside the electromagnet can exceed 1 T in a permanent operation mode. Such an electromagnet may be configured with a desired gap between pole shoes to accommodate an object or objects.

Figure 19:
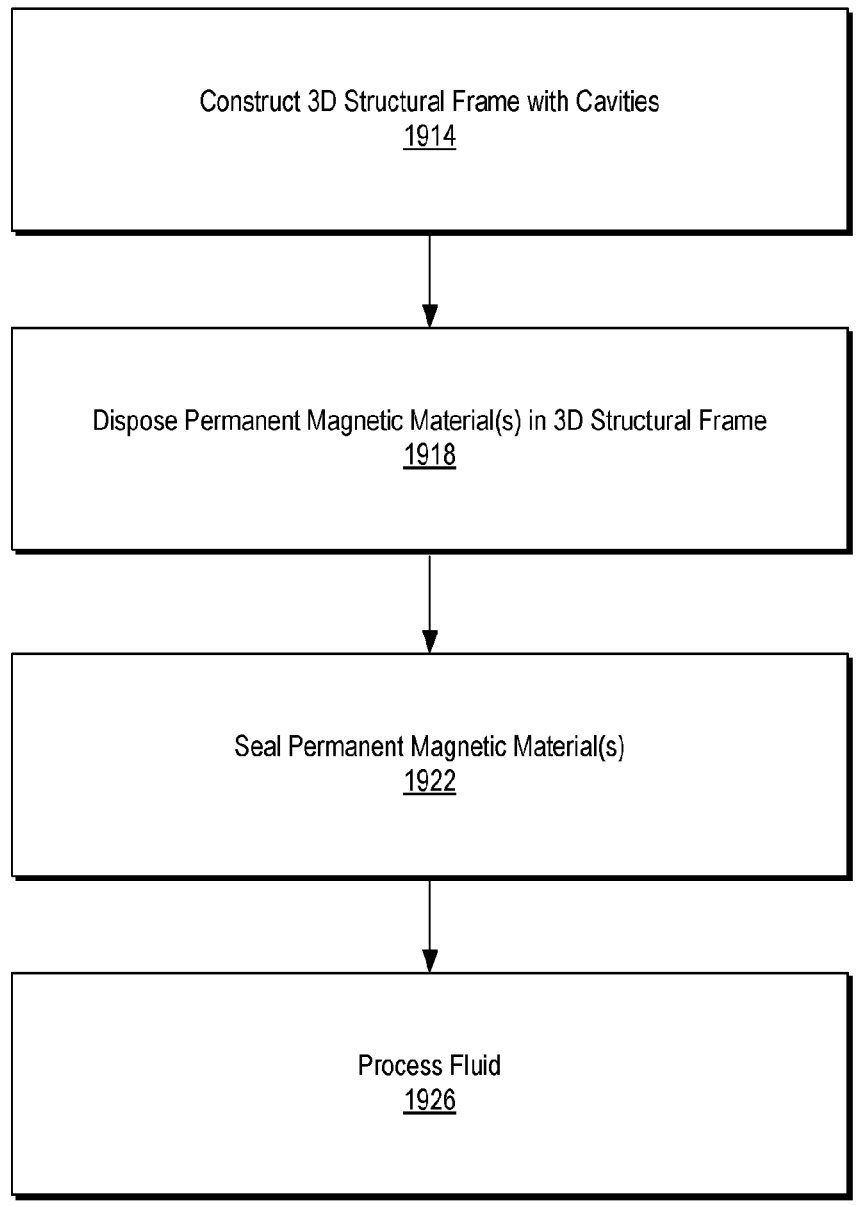
FIG. 19 illustrates an example of a method.

FIG. 19 shows an example of a method 1910 that includes a construction block 1914 for constructing a 3D structural frame with cavities (see, e.g., FIG. 17, FIG. 18, etc.), a deposition block 1918 for depositing permanent magnetic material(s) in the 3D structural frame (e.g., within at least some of the cavities), a seal block 1922 for sealing the permanent magnetic material(s) in the 3D structural frame, and a process block 1926 for processing fluid using the permanent magnetic material(s), which may be magnetized prior to, during, and/or after deposition thereof. The method 1910 may be performed at least in part using an additive process.

In the example of FIG. 19, the method can utilize additive manufacturing where, for example, magnets are positioned in cavities. As to sealing, such a process may utilize a metallic sheet, a polymeric sheet, a ceramic sheet, a shrink fit, an expansion fit, hydroforming, spray deposition, insertion, encapsulation, etc.

Figure 20:
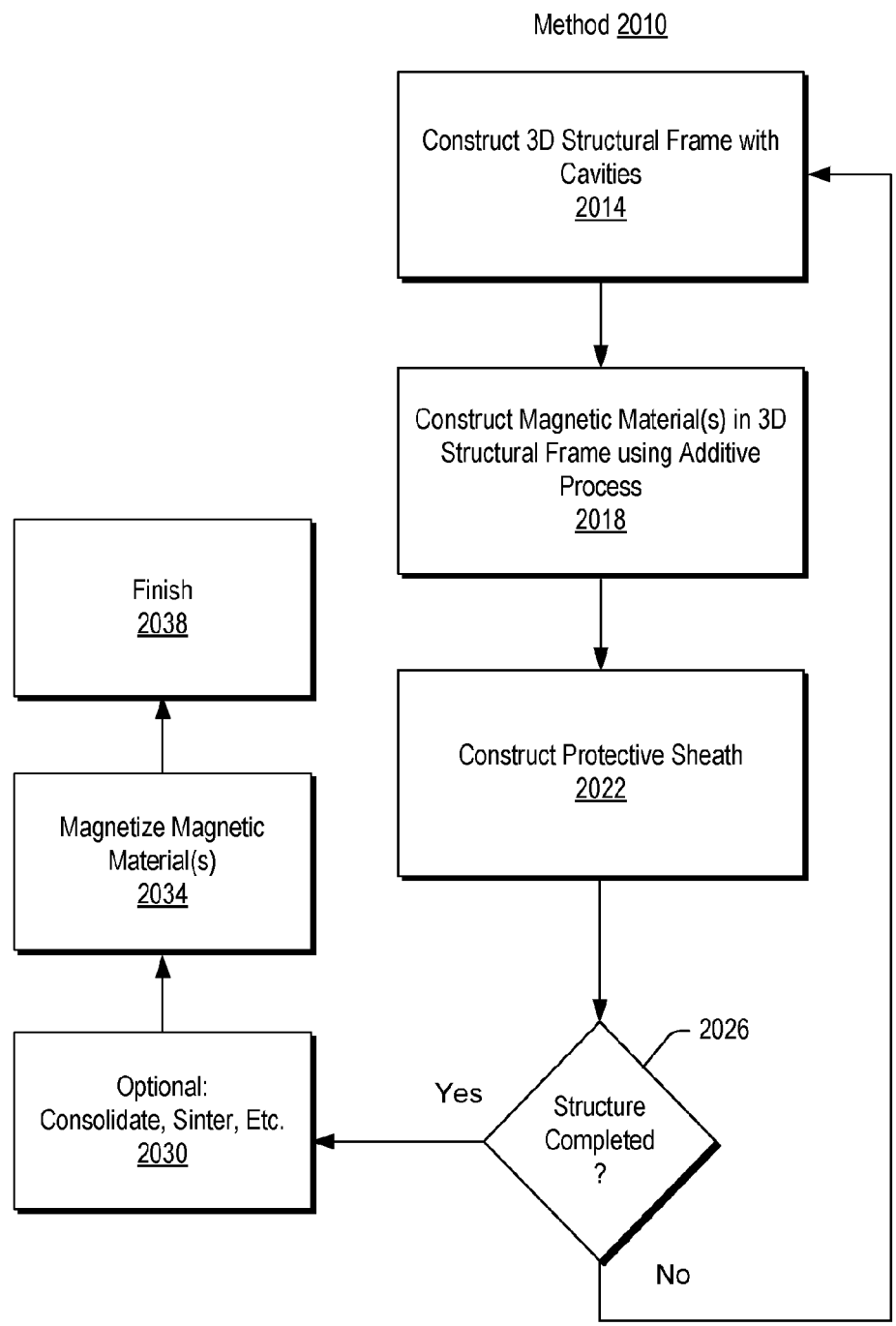
FIG. 20 illustrates an example of a method.

FIG. 20 shows an example of a method 2010 that includes a construction block 2014 for constructing a 3D structural frame with cavities, a construction block 2018 for constructing magnetic material(s) in the 3D structural frame using an additive process, a construction block 2022 for constructing a protective sheath that protects the magnetic material(s), a decision block 2026 that decides whether the structure is complete, an optional process block 2030 for optionally processing the structure if the decision block 2026 decides that it is complete, a magnetization block 2034 for magnetizing the magnetic materials, and a finish block 2038 for providing a finished component. In such an example, the magnetic material(s) can be constructed followed by magnetization, which may use a direct and/or an indirect technique.

As explained, a component can include a three-dimensional structure, with cavities/cells (e.g., a lattice structure) to accommodate magnets and optionally, for example, to provide a lighter and/or greener part (e.g., with lesser material). As explained, such a component may be built at least in part using additive manufacturing. As explained, various cells, interstices, voids, etc., may be utilized for positioning of magnetic material(s), which can be already magnetized, magnetized during deposition, and/or magnetized after deposition. As to during a deposition magnetization process, consider a "print" head that includes one or more coils that can magnetize material in a particular orientation. In such an example, a dose of material may be held within the print head and magnetized and/or the print head may magnetize after the material(s) have flowed out of the print head. As to the latter, consider depositing magnetic material in a cell of a lattice and then energizing a coil locally to cause the magnetic material deposited in the cell of the lattice to become permanently magnetized with a particular orientation of north and south poles. As mentioned, a design may include various orientations of poles and an additive process may include instructions for making the designed component where magnetization can be controlled by such instructions.

As an example, an additive manufacturing process may utilize binder jetting where a structural powder and a binder (e.g., wax-like) are concurrently deposited to create a solid yet unconsolidated part. As an example, a method can include, building a pre-form that is in a green state (e.g., using a powder additive) where the green state pre-form is subsequently consolidated by use of pressure and/or temperature. For example, consider a process where a wax-like binder is burnt and where pressure brings together non-volatile powder to consolidate it. In such an approach, with magnet material(s) within the structure (e.g., where the pre-form may be built at the same time, with a different material within a main material), that is not yet magnetized, the magnetic material may be subsequently magnetized (e.g., using a magnet, a coil, coils, etc.). As to finishing, one or more techniques may be applied (e.g., machining, thermal treatment, degaussing one or more portions, etc.).

As to some examples of materials, consider magnetic materials with relatively high coercivity. For example, consider rare-earth materials such as Neodymium-Iron-Boron (NIB) and/or Samarium Cobalt. As to a structural portion, consider, as examples, one or more of high-strength nickel alloy, cobalt alloy, and titanium. As to a protective layer, as examples, consider one or more of nickel-alloy, cobalt alloy, and titanium alloy. Table 1, below, shows some examples of materials where coercivity may be relatively high (e.g., NIB) or relatively low (e.g., alnico).

TABLE 1

Some examples of materials.

| Magnet | Prep | B (T) | H (kA/m) | $B \cdot H_{max}$ (kJ/m$^3$) | Tc (deg C.) |
| --- | --- | --- | --- | --- | --- |
| $Nd_2Fe_{14}B$ | Sintered | 1.0-1.4 | 750-2000 | 200-440 | 310-400 |
| $Nd_2Fe_{14}B$ | Bonded | 0.6-0.7 | 600-1200 | 60-100 | 310-400 |
| $SmCo_5$ | Sintered | 0.8-1.1 | 600-2000 | 120-200 | 720 |
| Sm(Co, Fe, Cu, Zr)$_7$ | Sintered | 0.9-1.15 | 450-1300 | 150-240 | 800 |
| AlNiCo (alnico) | Sintered | 0.6-1.4 | 275 | 10-88 | 700-860 |
| Sr-ferrite | Sintered | 0.2-0.4 | 100-300 | 10-40 | 450 |
| Iron | Annealed |  | 800 |  | 770 |

Figure 21:
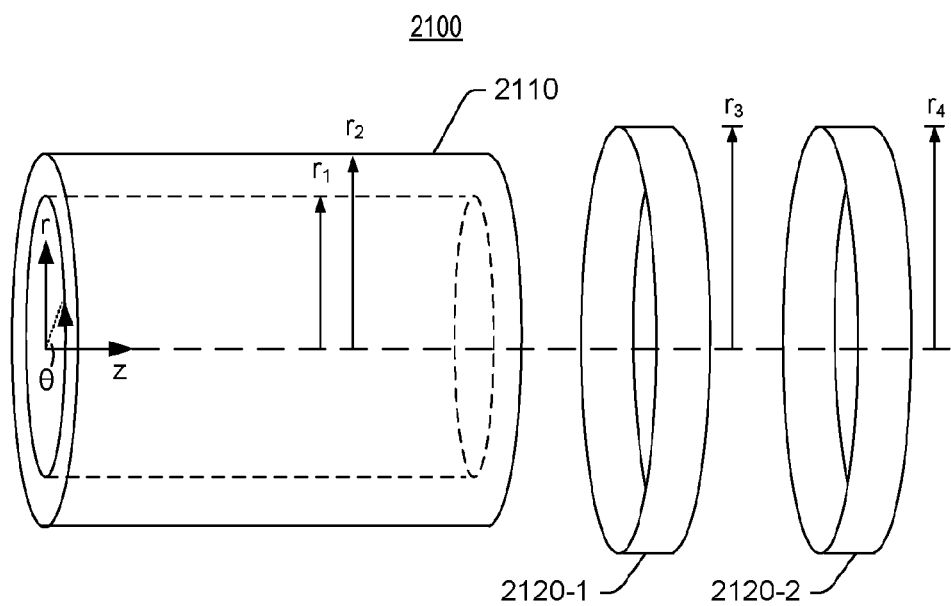
FIG. 21 illustrates an example of a component.

FIG. 21 shows an example of a system 2100 that can include a tubing 2110 and one or more rings 2120-1 and 2120-2. In such an example, the rings 2120-1 and 2120-2 can be ring magnets, which may be oriented as appropriate (e.g., where each ring may be of a particular polarity, etc.). Such rings may be internal and/or external, for example, depending on purpose. For example, where the rings are not to be exposed to a particular environment of a lumen of tubing, they may be positioned external. They may also be positioned external if an annular region is to be affected by a magnetic field.

In the example of FIG. 21, the tubing 2110 can be defined by one or more dimensions such as, for example, a length along the z-axis, an inner radius $r_1$ and an outer radius $r_2$. As shown, the one or more rings 2120-1 and 2120-2 can be defined by one or more dimensions such as, for example, a length along the z-axis, an azimuthal arc span or arc spans along the azimuthal coordinate θ and one or more radii such as $r_3$ or $r_4$ (e.g., a mean, an inner radius, an outer radius, etc.). A ring may be an outer ring, an inner ring or an inset ring that may be between an inner surface and an outer surface of the tubing 2110.

As an example, a magnet may be of a particular shape such as a button, a ring, a sphere, polyhedral, etc.

As explained, various components may include one or more magnets. Such components can include one or more of: valves (e.g., safety, flow control, isolation, gas-lift, injection, etc.) where such valves may include one or more types of valve mechanisms (e.g., piston, rotating ball, etc.);

orifices (e.g., injection control devices (ICDs), perforated liners, screens, etc.); and zone isolation elements (e.g., packers, etc.). A component may be suitable for use downhole, subsea and/or at surface. As explained, various examples can be suitable for downhole deployment and use.

As explained, a component may include one or more anti-scaling features that can be in addition to a magnetic anti-scaling feature. For example, consider one or more types of coatings. As an example, a coating may be applied. For example, consider a scale mitigation coating that can include one or more materials to further mitigate risk of scaling. As to some examples of materials, consider one or more polymeric materials, such as, for example, one or more of polyether ether ketone (PEEK), polytetrafluoroethylene (PTFE), fluorinated ethylene propylene (FEP), and perfluoroalkoxy alkane (PFA). As an example, a coating may include PEEK along with one or more of PTFE, FEP and PFA.

As an example, one or more members of the polyaryletherketone (PAEK) may be utilized to form a structure (e.g., as a coating, as a matrix, as a cap, etc.). PEEK is within the PAEK family and is a semi-crystalline thermoplastic with a linear aromatic polymer structure where recyclable material melts at 343 degrees C. PEEK possesses mechanical properties with resistance to chemicals, wear, fatigue and creep even at relatively high operating temperatures. PEEK also has low moisture absorption, stable dielectric (insulating) properties and inherently low flammability. Processing options include injection molding, compression molding, and extrusion into shapes, film or fibers, to thermoforming, spray coating, or stock shape machining.

As an example, PEEK, alone or as a mixture, can be utilized for additive manufacturing (e.g., 3D printing, etc.). For example, consider an extruder that can operate with a temperature in excess of the melting temperature of PEEK. As an example, a method can include depositing PEEK on to a substrate, which may be a composite structure, where the substrate may be heated to a temperature that is suitable for deposited PEEK (e.g., for forming, control of solidification, etc.).

As an example, a downhole component may be made at least in part of a polymer such as PEEK. For example, in some instances, PEEK can substitute for metal (e.g., metal, alloy, etc.). In such an example, carbon fibers, glass fibers, etc., may be included as structural reinforcements to provide strength and modulus properties akin to those of aluminum with a density that is lower than aluminum such that strength-to-weight ratio is increased compared to use of metal.

As an example, a downhole component can be a joint component that may be utilized to join two other components. As an example, a downhole component can be a sleeve that can be fit to another component (e.g., an inner sleeve, an outer sleeve, etc.). As an example, a downhole component may be at least in part made using an additive manufacturing process. As an example, a downhole component may be made using additive manufacturing where a support body is made using additive manufacturing and where a composite matrix is carried by the support body and made using additive manufacturing. In such an example, a cover material, which may be a cover layer, may be made using additive manufacturing. As mentioned, various types of high-performance polymers may be suitable for use as replacements for metal and may be suitable for use with one or more metallic components. As explained, a high-performance polymer may be reinforced with one or more materials (e.g., fibers, etc.).

As an example, a downhole component can include a support body that includes a surface that defines at least a portion of a fluid passage; a composite matrix for scale mitigation supported by the surface of the support body where the composite matrix includes a lattice material that defines a lattice and magnetic material disposed in interstices of the lattice; and a cover layer disposed on the composite matrix. In such an example, at least a portion of the magnetic material can be magnetized, for example, during manufacture or after manufacture, optionally on-site at a rig, etc., that is utilized to deploy, install, etc., the downhole component.

As an example, a downhole component can include magnetic material disposed in interstices of a lattice to define a pattern. In such an example, a fluid passage defined at least in part by the downhole component can define an axis of a cylindrical coordinate system where the pattern is defined with respect to the cylindrical coordinate system.

As an example, a downhole tool can define, at least in part, a fluid passage that includes a length where magnetic material disposed in interstices of a lattice of the downhole tool (e.g., a composite matrix) can be distributed along at least a portion of the length of the fluid passage. In such an example, fluid flow along a length may be exposed to one or more magnetic fields. As explained, where magnetic field orientations, strengths, etc., differ with respect to a flow field, as fluid flows, it may experience magnetic field(s) that change in time (e.g., alternating, strength gradient, etc.). Such changes can depend on the flow field, flow rate, flow velocity, flow velocity components, etc.

As an example, magnetic material of a downhole component can be magnetized and generate a plurality of individual magnetic fields. In such an example, the plurality of individual magnetic fields can include multiple magnetic field orientations with respect to a fluid passage defined at least in part by the downhole component. For example, multiple magnetic field orientations can include, with respect to the fluid passage, north pole toward-south pole away and south pole toward-north pole away orientations.

As an example, a downhole component can include a surface of a support body that defines an outer perimeter of a fluid passage or that defines an inner perimeter of the fluid passage. For example, a downhole component can define a lumen with a cross-sectional area where fluid can flow and/or a downhole component can define at least part of an annulus with an annular cross-sectional area where fluid can flow.

As an example, a downhole component can include magnetic material where at least a portion of the magnetic material forms an anti-scale feature. In such an example, the anti-scale feature can promote metal ion hydration of a solution in the fluid passage and/or promote formation non-adherent bulk solution particles of a solution in the fluid passage over formation of nucleating scale. In such examples, the solution can include calcium ions and where the non-adherent bulk solution particles can include calcium carbonate. As an example, an anti-scale feature can reduce particle size of precipitates from a solution in a fluid passage.

As an example, a downhole component can include magnetic material where at least a portion of the magnetic material forms an interfacial effect feature. For example, consider an interfacial effect feature that can alter interfacial tension between a gas and a liquid in the fluid passage. In such an example, the downhole component may be part of an air-lift downhole tool or system. For example, consider altering interfacial tension between injected gas and fluid in tubing.

As an example, a downhole tool can include magnetic material where at least a portion of the magnetic material forms a controlled release anti-scalant feature. In such an example, controlled release may be of an anti-scalant that is carried by the downhole tool, which may be embedded, flowable via a chamber or chambers, etc. As explained, one or more phenomena may cause controlled release of an anti-scalant. Such phenomena may include flow where flow in a magnetic field or magnetic fields may alter an anti-scalant material for release of anti-scalant.

As explained, magnetic material may be in a magnetized state (e.g., magnetized) or in an unmagnetized state (e.g., unmagnetized). As explained, various techniques may be utilized to magnetize magnetic material (e.g., an electrical coil, a permanent magnet, etc.). As an example, a downhole component can include anti-scalant, where at least a portion of magnetic material of the downhole component, when magnetized, can control release of the anti-scalant.

As explained, a downhole component can include magnetic material where at least a portion of the magnetic material provides for anti-scaling and positional guidance. Such an approach can be a dual function approach where the magnetic material provides for two different functions (e.g., an anti-scaling function and a positional function).

As an example, magnetic material can include one or more of Neodymium-Iron-Boron (NIB), Samarium Cobalt, and Aluminum-Nickel-Cobalt (Alnico); noting that one or more other magnetic materials may be utilized. As an example, a magnetic material can include a rare-earth magnetic material.

The rare-earth (lanthanide) elements are metals that are ferromagnetic, meaning that like iron they can be magnetized to become permanent magnets, but their Curie temperatures (the temperature above which their ferromagnetism disappears) are below room temperature, so in pure form their magnetism appears at low temperatures. However, they form compounds with the transition metals such as iron, nickel, and cobalt, and some of these compounds have Curie temperatures well above room temperature. Rare-earth magnets tend to be made using one or more transition metals to provide for an increase in Curie temperature.

As an example, a lattice of a composite matrix for scale mitigation can include a polymeric material. As an example, a cover layer that covers at least a portion of a composite matrix can include a polymeric material, which may be, for example, a scale mitigant. For example, consider a material that can hinder scale formation via its surface properties. As an example, types of materials that may inhibit scale formation can include acrylic acid polymers, maleic acid polymers and phosphonates. As an example, a scale inhibiting material can include one or more of poly-phosphono carboxylic acid (PPCA) and diethylenetriamine-penta (methylene phosphonic acid) (DTPMP). As an example, one or more of such materials may be included in a downhole component, for example, in a matrix, in a cover, etc.

As an example, a method can include providing a support body of a downhole component, where the support body includes a surface that defines at least a portion of a fluid passage; forming a composite matrix for scale mitigation that is supported by the surface of the support body where the composite matrix includes a lattice material that defines a lattice and magnetic material disposed in interstices of the lattice; and forming a cover layer on the composite matrix.

In such an example, forming the composite matrix can include utilizing an additive manufacturing technique. As an example, a subtractive technique may be utilized optionally in combination with an additive technique. For example, consider a subtractive technique that may ablate or otherwise remove material to form voids (e.g., interstices) where at least some of the voids can be filled with one or more materials (e.g., magnetic material, etc.).

As an example, a method can include magnetizing at least a portion of deposited magnetic material. In such an example, the method can include controlling the magnetizing during deposition of the magnetic material in the interstices of the lattice, for example, by controlling current supplied to a movable deposition and magnetization assembly.

As an example, a magnetization process can perform magnetizing that forms a plurality of individual magnetic fields. For example, a plurality of individual magnetic fields may include multiple magnetic field orientations with respect to a fluid passage defined in part by a downhole component where the multiple magnetic field orientations can include, with respect to the fluid passage, north pole toward-south pole away and south pole toward-north pole away orientations.

As an example, a method can include forming a composite matrix by utilizing an additive manufacturing technique to from a pre-form in a green state. In such an example, the method can include consolidating the pre-form to transition the pre-form from the green state to a consolidated state (e.g., consider using one or more of pressure, temperature, UV energy, gas, laser, etc.).

As an example, a consolidate state can include interstices where, for example, a method can include depositing magnetic material in the interstices to form a composite matrix prior to forming a cover layer on the composite matrix.

As an example, a method can include forming a composite matrix where the composite matrix includes a lattice material that defines a lattice and magnetic material disposed in interstices of the lattice; and assembling a downhole component that includes the composite matrix for scale mitigation supported by a support body, where the support body includes a surface that defines at least a portion of a fluid passage of the downhole component. In such an example, forming the composite matrix can include forming a tube and/or forming a sheet.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:
1. A downhole component comprising:
a support body that comprises a surface that defines at least a portion of a fluid passage;
a composite matrix for scale mitigation supported by and directly contacting the support body, wherein the composite matrix comprises:

a lattice material that defines a plurality of cavities, wherein the plurality of cavities defines a hexagonal honeycomb structure; and a magnetic material disposed in the plurality of cavities of the lattice material; and a cover layer disposed on and directly contacting the composite matrix, the cover layer positioned to seal the magnetic material from the fluid passage.

2. The downhole component of claim 1, wherein the downhole component comprises a valve or mandrel and at least a portion of the magnetic material is magnetized.

3. The downhole component of claim 1, wherein the fluid passage comprises a length and wherein the magnetic material is distributed along at least a portion of the length of the fluid passage.

4. The downhole component of claim 1, wherein the magnetic material is magnetized and generates a plurality of individual magnetic fields.

5. The downhole component of claim 1, wherein the surface of the support body defines an outer perimeter of the fluid passage or defines an inner perimeter of the fluid passage.

6. The downhole component of claim 1, wherein at least a portion of the magnetic material forms an anti-scale feature that promotes at least one of metal ion hydration of a solution in the fluid passage or formation of non-adherent bulk solution particles of a solution in the fluid passage over formation of nucleating scale.

7. The downhole component of claim 6, wherein the solution comprises calcium ions and wherein the non-adherent bulk solution particles comprise calcium carbonate.

8. The downhole component of claim 6, wherein the anti-scale feature reduces particle size of precipitates from a solution in the fluid passage.

9. The downhole component of claim 1, wherein the support body is part of gas-lift equipment, wherein at least a portion of the magnetic material forms an interfacial effect feature, and wherein the interfacial effect feature alters interfacial tension between a gas and a liquid in the fluid passage.

10. The downhole component of claim 1, further comprising anti-scalant contained by the magnetic material, wherein at least a portion of the magnetic material controls release of the anti-scalant based at least partially on application of a magnetic field to the magnetic material.

11. The downhole component of claim 1, wherein at least a portion of the magnetic material provides for anti-scaling and positional guidance of the downhole component.

12. The downhole component of claim 1, wherein the magnetic material comprises at least one of Neodymium-Iron-Boron (NIB), Samarium Cobalt, and Aluminum-Nickel-Cobalt (Alnico).

13. The downhole component of claim 1, wherein the lattice material comprises a polymeric material.

14. The downhole component of claim 1, wherein the cover layer comprises a polymeric material.

15. The downhole component of claim 14, wherein the polymeric material comprises a scale mitigant.

16. The downhole component of claim 1, wherein the magnetic material comprises polymer-bonded magnets comprising magnetic powder embedded in a polymer binder matrix.

17. The downhole component of claim 16, wherein the polymer binder matrix comprises polyamide.

18. A method comprising:
providing a support body of a downhole component, wherein the support body comprises a surface that defines at least a portion of a fluid passage;
forming, by additive manufacturing, a composite matrix for scale mitigation that is supported by the surface of the support body wherein the composite matrix comprises a lattice material that defines a lattice having a hexagonal honeycomb structure and magnetic material disposed in interstices of the lattice; and
forming a cover layer on the composite matrix.

19. A method comprising:
forming, by additive manufacturing, a composite matrix wherein the composite matrix comprises a lattice material that defines a lattice having a hexagonal honeycomb structure and magnetic material disposed in interstices of the lattice; and
assembling a downhole component that comprises the composite matrix for scale mitigation supported by a support body, wherein the support body comprises a surface that defines at least a portion of a fluid passage of the downhole component.

* * * * *